US010955391B2

(12) United States Patent
Cormier et al.

(10) Patent No.: US 10,955,391 B2
(45) Date of Patent: Mar. 23, 2021

(54) MULTI-INJECTION MODE VALVE MODULE

(71) Applicant: Waters Technologies Corporation, Milford, MA (US)

(72) Inventors: Sylvain Cormier, Mendon, MA (US); Richard W. Andrews, Rehoboth, MA (US); Peyton C. Beals, Wrentham, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 375 days.

(21) Appl. No.: 15/559,276

(22) PCT Filed: Feb. 17, 2016

(86) PCT No.: PCT/US2016/018218
§ 371 (c)(1),
(2) Date: Sep. 18, 2017

(87) PCT Pub. No.: WO2016/160157
PCT Pub. Date: Oct. 6, 2016

(65) Prior Publication Data
US 2018/0088091 A1 Mar. 29, 2018

Related U.S. Application Data

(60) Provisional application No. 62/140,615, filed on Mar. 31, 2015.

(51) Int. Cl.
*G01N 30/88* (2006.01)
*G01N 30/32* (2006.01)
(Continued)

(52) U.S. Cl.
CPC ............ *G01N 30/32* (2013.01); *G01N 30/20* (2013.01); *G01N 30/22* (2013.01); *G01N 30/24* (2013.01);
(Continued)

(58) Field of Classification Search
USPC ........................................................ 73/1.02
See application file for complete search history.

(56) References Cited

U.S. PATENT DOCUMENTS

2002/0020670 A1* 2/2002 Petro .................. G01N 35/1097
210/656
2002/0107652 A1* 8/2002 Andrews ............... G01N 30/88
702/104

(Continued)

FOREIGN PATENT DOCUMENTS

CN 102269746 A 12/2011
DE 10356955 B3 6/2005
(Continued)

OTHER PUBLICATIONS

International Preliminary Report on Patentability in International Patent Application No. PCT/US16/18218, dated Oct. 12, 2017; 11 pages.

(Continued)

Primary Examiner — Peter J Macchiarolo
Assistant Examiner — Mohammed E Keramet-Amircolai
(74) Attorney, Agent, or Firm — Schmeiser, Olsen & Watts LLP

(57) ABSTRACT

A chromatography system has an associated system volume and a sample dispersion volume. The chromatography system comprises a pump pumping a flow of gradient, a sample manager for introducing a sample into the flow of gradient, and a valve manager fluidically coupled to the pump and to the sample manager. The valve manager includes at least one valve. A first valve of the at least one valve has a plurality of ports including an inlet port that receives the flow of gradient from the pump and an outlet port through which the flow of gradient exits the first valve. The first valve has at least two different, automatically selectable positions. A first position of the at least two different automatically selectable (Continued)

positions operating to change one of the system and sample dispersion volumes of the chromatography system when the first valve is automatically switched into the first position.

27 Claims, 16 Drawing Sheets

(51) Int. Cl.
    *G01N 30/34*     (2006.01)
    *G01N 30/20*     (2006.01)
    *G01N 30/24*     (2006.01)
    *G01N 30/22*     (2006.01)
    *G01N 30/86*     (2006.01)
    *G01N 30/02*     (2006.01)

(52) U.S. Cl.
    CPC ......... *G01N 30/34* (2013.01); *G01N 30/8665* (2013.01); *G01N 30/88* (2013.01); *G01N 2030/027* (2013.01); *G01N 2030/201* (2013.01); *G01N 2030/202* (2013.01); *G01N 2030/328* (2013.01); *G01N 2030/347* (2013.01); *G01N 2030/8804* (2013.01); *G01N 2030/889* (2013.01); *G01N 2030/8881* (2013.01)

(56) References Cited

U.S. PATENT DOCUMENTS

| | | | | |
|---|---|---|---|---|
| 2005/0277199 A1* | 12/2005 | Isbell | ................ | G01N 30/82 436/161 |
| 2011/0315633 A1* | 12/2011 | Cormier | .............. | F16K 11/0655 210/656 |
| 2012/0205464 A1* | 8/2012 | Pardonge | .............. | A61M 15/08 239/102.1 |
| 2012/0305464 A1* | 12/2012 | Cormier | ................ | G01N 30/20 210/198.2 |
| 2014/0326664 A1* | 11/2014 | Joudrey | .................. | F16K 11/02 210/635 |

FOREIGN PATENT DOCUMENTS

| | | | | |
|---|---|---|---|---|
| DE | 102014103766 A1 | 6/2014 | | |
| DE | 102014110865 A1 | 12/2014 | | |
| JP | H0264453 A | 3/1990 | | |
| JP | 2004053445 A | 2/2004 | | |
| JP | 2006227029 A | 8/2006 | | |
| JP | 2007205954 A | 8/2007 | | |
| JP | 4921993 B2 | 4/2012 | | |
| JP | 2012117934 A | 6/2012 | | |
| WO | 2014055638 A1 | 4/2014 | | |
| WO | WO-2014055638 A1 * | 4/2014 | ............. | G01N 30/06 |
| WO | WO-2016018218 A1 * | 2/2016 | ......... | G11C 13/0007 |

OTHER PUBLICATIONS

"Nexera-i MT: i-Series Method Transfer System," Shimadzu Corporation, Shimadzu.com, accessed Mar. 21, 2016.
International Search Report & Written Opinion in International Patent Application No. PCT/US16/18218, dated Jul. 12, 2016; 14 pages.
Extended Search Report in European Patent Application No. 16773640.4 dated Feb. 18, 2019; 12 pages.
Nadler, Tim, et al. "Automated proteolytic mapping of proteins," Journal of Chromatography A, Aug. 30, 1996, pp. 91-98, Vo. 743, No. 1, Elsevier, Amsterdam.
Webster, Gregory K., Thomas F. Cullen, and Laila Kott "Chapter 2: Method Transfer Between HPLC and UHPLC Platforms," Ultra-High Performance Liquid Chromatography and It's Applications, 2013, pp. 31-54.
Examination Report in related Indian Patent Application No. 201717030515 dated Nov. 24, 2020. 7 pages.

* cited by examiner

MULTI-INJECTION MODE VALVE MODULE

RELATED APPLICATIONS

This application claims priority to U.S. Provisional Application Ser. No. 62/140,615, filed on Mar. 31, 2015 entitled "MULTI-INJECTION MODE VALVE MODULE", the entirety of which is incorporated by reference herein.

FIELD OF THE INVENTION

The invention relates generally to chromatography systems, More specifically, the invention relates to valve modules used to add volume selectively and automatically to a chromatography system.

BACKGROUND

Chromatography is a set of techniques for separating a mixture into its constituents. Generally, in a liquid chromatography analysis, a pump system takes in and delivers a mixture of liquid solvents (and/or other fluids) to a sample manager, where a sample is injected into the solvent stream. The sample is the material under analysis. Examples of samples include, but are not limited to, complex mixtures of proteins, protein precursors, protein fragments, reaction products, and other compounds. The mobile phase comprised of a sample with the mixture of solvents (and/or other fluids), moves to a point of use, such as a separation column, referred to as the stationary phase, By passing the mobile phase through the column, the various components in the sample separate from each other at different rates and thus elute from the column at different times. A detector may receive the separated components from the column and produce an output from which the identity and quantity of the analytes may be determined.

Important to the successful performance of a chromatography system by such entities, for example, as pharmaceutical laboratories, companies, and other facilities, is ensuring the chromatography system is qualified for use in regulated environments. Various national and international regulations, quality standards, and company policies require the qualification of the analytical instruments involved in the chromatographic separations. Qualification pertains to instruments, ranging from individual modules and to complete chromatography systems (i.e., pump, sample injector, column module, and detector). A qualification may be performed initially, before use of a chromatography system, to establish a baseline and to determine if performance falls within predefined specifications, and, then regularly thereafter, to ensure the chromatography system remains within specification.

Full system qualifications generally test a chromatography system in a manner that the chromatography system is expected to be used. A variant of full system qualification is to qualify unique aspects of each configuration. For example, in high sample dispersion mode, system precision, injector linearity, and carryover require verification. The same metrics require verification for a low sample dispersion mode.

Manually changing the system mixing volume or the sample dispersion of a liquid chromatography (LC) system is a common practice used to accommodate the needs of a particular LC separation. Such manual alterations, however, can invalidate the qualification of the LC system, thereby requiring a time-consuming requalification before the altered LC system can be used.

SUMMARY

All examples and features mentioned below can be combined in any technically possible way.

In one aspect, a chromatography system with an associated system volume and a sample dispersion volume comprises a pump pumping a flow of gradient, a sample manager for introducing a sample to the flow of gradient, and a valve manager fluidically coupled to the pump and to the sample manager. The valve manager includes at least one valve. A first valve of the at least one valve has a plurality of ports including an inlet port that receives the flow of gradient from the pump and an outlet port through which the flow of gradient exits the first valve. The first valve has at least two different, automatically selectable positions. A first position of the at least two different automatically selectable positions of the first valve operates to change one of the system and sample dispersion volumes of the chromatography system when the first valve is automatically switched into the first position.

Embodiments of the chromatography system may include one of the following features, or any combination thereof.

The chromatography system may further comprise a valve drive operatively coupled to the first valve, and a processor in communication with the valve drive. The processor is programmed to qualify the chromatography system with the first valve in the first position, to operate the valve drive to switch the first valve automatically from the first position into a second position of the at least two different automatically selectable positions, and to qualify the chromatography system with the first valve in the second position.

The valve manager may further include at least one mixer. A first mixer of the at least one mixer may be connected between a third port and a fourth port of the first valve. The first position of the at least two different automatically selectable positions of the first valve places the first mixer of the at least one mixer into a path of the flow of gradient from the pump to change the system volume of the chromatography system. A volume of the first mixer may be predetermined to increase the system volume of the chromatography system to match a system volume of another model of chromatography system. A second mixer may be disposed in the path of the flow of gradient between the pump and the first valve. Alternatively, a second mixer of the at least one mixer may be connected between a fifth port and a sixth port of the first valve. A second position of the at least two different positions of the first valve places the second mixer of the at least one mixer into the path of the flow of gradient from the pump, while removing the first mixer from the path.

In other embodiments of the chromatography system, the pump may comprises the first valve, or the first valve may include seven ports, or the sample manager may include a flow-through needle with a tip and a proximal end opposite the tip, wherein the first position of the at least two different automatically selectable positions of the first valve operates to change the sample dispersion volume of the chromatography system by directing the flow of gradient in a reverse direction through the sample manager such that the flow of gradient enters the flow-through needle through the tip.

In another embodiment, the valve manager may further include at least one mixer. A first mixer of the at least one mixer is connected between a third port and a fourth port of the first valve. The first position of the at least two different automatically selectable positions of the first valve places the first mixer of the at least one mixer into a path of flow of sample composition between the sample manager and a column manager to increase the sample dispersion volume of the chromatography system. The at least one mixer may include a second mixer connected between a fifth port and a sixth port of the first valve. A second position of the at least two different automatically selectable positions of the first valve places the second mixer into the path of the flow of sample composition between the sample manager and a column manager, while removing the first mixer from the path of the flow of sample composition between the sample manager and the column manager.

The chromatography system may further comprise a column manager. The at least one valve of the valve manager may include a second valve. The second valve has a plurality of ports including an inlet port connected to the sample manager for receiving a flow of sample composition therefrom and an outlet port fluidically coupled to the column manager for passing the flow of sample composition thereto. The sample manager may include a flow-through needle with a tip and a proximal end opposite the tip. The second valve may have a second inlet port connected to the outlet port of the first valve for receiving the flow of gradient therefrom. The second valve has at least two different automatically selectable positions. A first position of the at least two different positions of the second valve directs the flow of gradient through the sample manager in a forward direction such that the flow of gradient enters the flow-through needle through the proximal end and a second position of the at least two different positions of the second valve directs the flow of gradient through the sample manager in a reverse direction such that the flow of gradient enters the flow-through needle through the tip. The valve manager may further include a first mixer of the at least one mixer being connected between a third port and a fourth port of the first valve and a second mixer connected between a fifth port and a sixth port of the first valve. A second position of the at least two different automatically selectable positions of the first valve places the second mixer into the path of the flow of gradient from the pump, while bypassing the first mixer.

In one embodiment, the sample manager may include a flow-through needle with a tip and a proximal end opposite the tip. The second valve may have a second inlet port connected to the outlet port of the first valve for receiving the flow of gradient therefrom. Also, the second valve may have at least two different automatically selectable positions. A first position of the at least two different positions of the second valve directs the flow of gradient through the sample manager in a forward direction such that the flow of gradient enters the flow-through needle through the proximal end and a second position of the at least two different positions of the second valve directs the flow of gradient through the sample manager in a reverse direction such that the flow of gradient enters the flow-through needle through the tip.

In another embodiment, the outlet port of the first valve is fluidically coupled to the sample manager for passing the flow of gradient thereto. In this embodiment, the chromatography system may further comprise a first mixer connected between a third port and a fourth port of the first valve, a second mixer connected between a fifth port and a sixth port of the first valve, wherein a second position of the at least two different automatically selectable positions of the first valve places the second mixer into the path of the flow of gradient from the pump, while removing the first mixer from the path, and a third mixer connected between a first port and a second port of the second valve. The second valve has at least two different automatically selectable positions. A first position of the at least two different automatically selectable positions of the second valve places the third mixer in a path of the flow of sample composition between the sample manager and the column manager.

In addition, the chromatography system may further comprise a fourth mixer connected between a third port and a fourth port of the second valve, wherein a second position of the at least two different automatically selectable positions of the second valve places the fourth mixer into the path of the flow of sample composition between the sample manager and the column manager, while removing the third mixer from the path of the flow of sample composition between the sample manager and the column manager.

In another aspect, a valve module used in chromatography comprises at least one rotary valve. A first rotary valve of the at least one rotary valve has a plurality of ports including an inlet port for receiving a flow of gradient and an outlet port through which the flow of gradient exits the first rotary valve. The first rotary valve has at least two different automatically selectable positions. The valve module further comprises at least one mixer including a first mixer connected between a third port and a fourth port of the first rotary valve, and a valve drive operatively coupled to the first rotary valve and responsive to a control command from a processor to switch the first rotary valve automatically into the first position of the at least two different automatically selectable positions to place the first mixer into a path of the flow of gradient.

Embodiments of the valve module may include one of the following features, or any combination thereof.

The first valve may include seven ports.

The valve module may further comprise a second mixer of the at least one mixer connected between a fifth port and a sixth port of the first rotary valve. A second position of the at least two different positions of the first rotary valve places the second mixer of the at least one mixer into the path of the flow of gradient from the pump, while removing the first mixer from the path. The at least one rotary valve may include a second rotary valve. The second rotary valve has a plurality of ports including an inlet port for receiving a flow of sample composition from a sample manager and an outlet port fluidically coupled to a column manager for passing the flow of sample composition thereto. The second rotary valve may have a second inlet port connected to the outlet port of the first rotary valve for receiving the flow of gradient therefrom. The second rotary valve has at least two different positions. A first position of the at least two different positions of the second valve is for directing the flow of gradient through the sample manager in a forward direction and a second position of the at least two different positions of the second valve is for directing the flow of gradient through the sample manager in a reverse direction.

In one embodiment, the valve module may further comprise a second mixer of the at least one mixer connected between a fifth port and a sixth port of the first rotary valve. A second position of the at least two different positions of the first rotary valve places the second mixer of the at least one mixer into the path of the flow of gradient from the pump, while removing the first mixer from the path. The second rotary valve may have a second inlet port connected to the outlet port of the first rotary valve for receiving the flow of gradient therefrom. The second rotary valve has at least two different positions. A first position of the at least two different positions of the second rotary valve is for directing the flow of gradient through the sample manager in a forward direction and a second position of the at least two different positions of the second valve is for directing the flow of gradient through the sample manager in a reverse direction.

In one embodiment, the outlet port of the first rotary valve may be fluidically couplet, to the sample manager for passing the flow of gradient thereto, and the valve module may further comprise a second mixer, of the at least one mixer, connected between a fifth port and a sixth port of the first rotary valve, wherein a second position of the at least two different positions of the first rotary valve places the second mixer of the at least one mixer into the path of the flow of gradient from the pump, while removing the first mixer from the path. In this embodiment, the valve module may further comprise a third mixer connected between a third port and a fourth port of the second rotary valve. The second valve has at least two different positions. A first position of the at least two different positions of the second valve places the third mixer in a path of the flow of sample composition between the sample manager and the column manager. In addition, a fourth mixer may be connected between a fifth port and a sixth port of the second rotary valve, wherein a second position of the at least two different positions of the second rotary valve places the fourth mixer into the path of the flow of sample composition between the sample manager and the column manager, while removing the third mixer from the path of the flow of sample composition between the sample manager and the column manager.

In still another aspect, a method is provided of running a liquid chromatography system having an associated system volume and a sample dispersion volume. The liquid chromatography system further has a valve manager fluidically coupled to a pumping system and a sample manager. The valve manager includes at least one valve. A first valve of the at least one valve has a plurality of ports including an inlet port that receives the flow of gradient from the pump and an outlet port through which the flow of gradient exits the first valve. The first valve has at least two different, automatically selectable positions. A first position of the at least two different automatically selectable positions of the first valve increases one of the system and sample dispersion volumes of the chromatography system. The method comprises qualifying the liquid chromatography system with the first valve in the first position of the at least two different automatically selectable positions, qualifying the liquid chromatography system with the first valve in the second position of the at least two different automatically selectable positions, performing a chromatographic run with the first valve of the valve manager in the first position, switching the first valve from the first position to the second position, and performing a chromatographic run with the first valve of the valve manager in the second position without having to requalify the liquid chromatography system.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
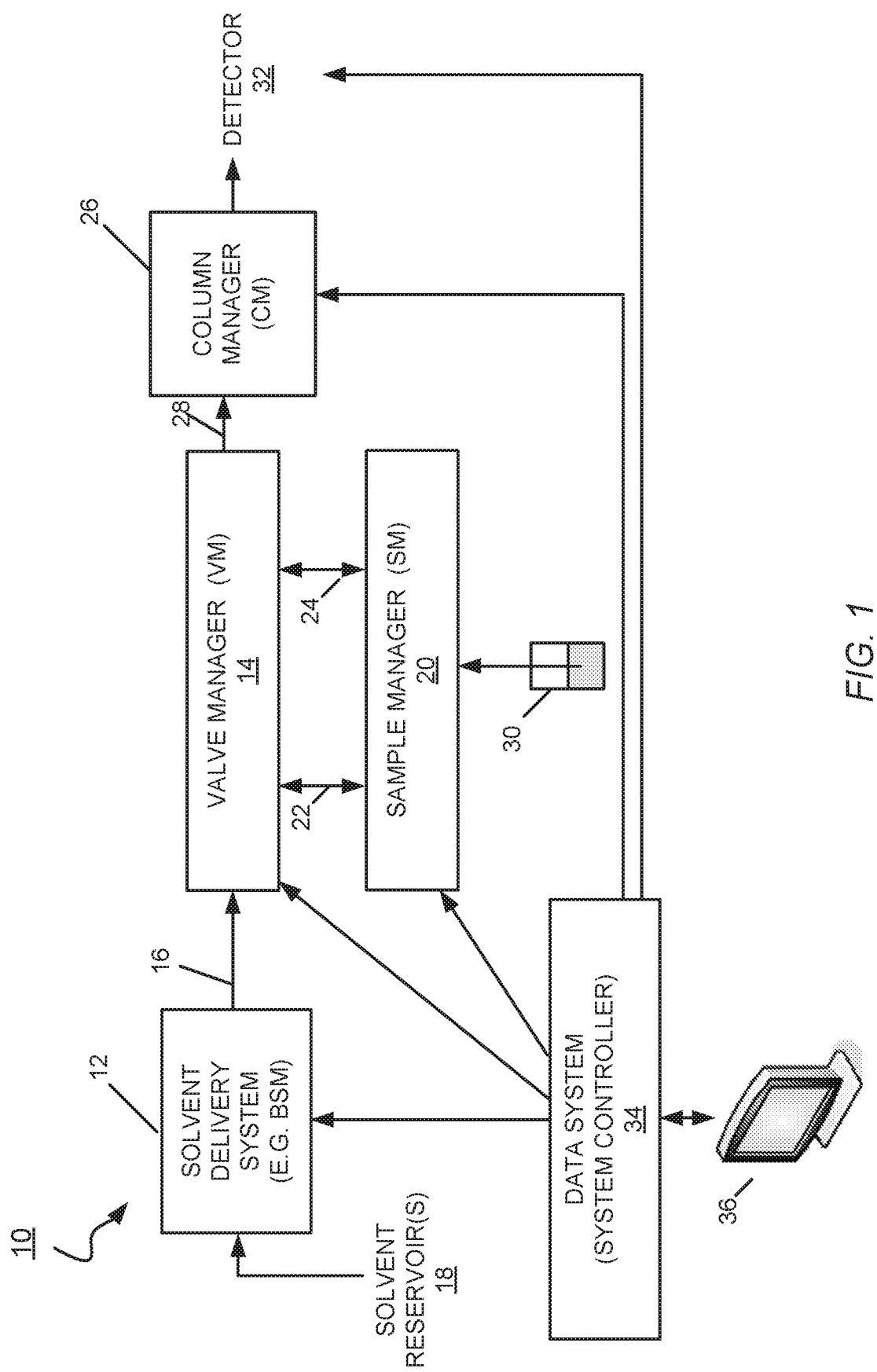
FIG. 1 is a diagram of an embodiment of a liquid chromatography (LC) system with a volume manager used to add volume selectively and automatically to the LC system without having to requalify the LC system.

Chromatography systems described herein use a valve manager (also, valve module) to enable a user to automate the changing of the system mixing volume, sample dispersion volume, or both, of a liquid chromatography (LC) system so the LC system can accommodate the particular needs of the chromatographic separation. As used herein, system mixing refers to mixing occurring downstream of the pump because of tubing, system components, and additional selectable volumes. System mixing volume (or simply system volume—also known as gradient delay volume and dwell volume) refers to the overall fluid volume of such tubing, system components, and additional selectable volumes, from where the eluents (i.e., by a gradient proportioning valve or mixing tee) are proportioned to the inlet of the column. Sample dispersion refers to the dispersion of the sample as the sample travels through the tubing and connectors on the path to the column. Sample dispersion volume, as used herein, refers to the overall fluid volume of tubing, system components (e.g., a flow-through needle), and additional selectable volumes, from where the sample is introduced to the gradient to the inlet of the column.

The configurability of the valve manager enables a user to select a configuration automatically that gives the LC system characteristics that closely match the characteristics of older chromatographic systems. This ability to configure a contemporary LC system in order to match the characteristics of an older (legacy) chromatographic system is key to enabling efficient methods et transfer of older separations and methods taken from pharmaceutical compendia to the contemporary LC system. One can then transfer a method from the legacy chromatographic system without having to make any changes to the programmed gradient (i.e., the software that programs the method running through the LC system).

In addition, the LC system can be fully qualified in each of the multiple configurations of the valve manager through any qualification software, such as Systems Qualification Technology (SQT), without any disconnection or reconnection of any components or tubing. Fully qualifying the system in each of the valve manager configurations through SQT enables the user to ensure that both legacy and contemporary separations can be successfully run on the same chromatograph, without requiring a requalifying of the LC system each time a switch is made between the two types of separations, such switching being made by virtue of changing the valve manager configuration. Because the characteristics of a legacy chromatographic system can be switched as part of an instrument method, such characteristics can be qualified as part of the automated portion of the SQT.

In brief overview, each embodiment of valve manager described herein has multiple configurations. The valve manager has one or two conventional valves configured for automated control of the system mixing volume, sample dispersion volume, or both. The user can change the effective system mixing volume and sample dispersion volume, independently of the other.

In an example embodiment of a valve manager having two valves, the first of two valves is connected to the outlet of a pump and an inlet of the second valve, and an outlet of the second valve is connected to an inlet line and outlet line of the sample manager. The first valve can serve to introduce additional mixing volume to the outlet of the pump, thus changing the system mixing volume, while the second valve can determine a direction (forward or reverse) of the flow path through the sample manager, thus affecting the sample dispersion volume. Either valve can switch independently of the other, thus enabling the independent changes to the system mixing volume and sample dispersion volume.

FIG. 1 shows an embodiment of a liquid chromatography (LC) system 10 for separating a mixture into its constituents. Example implementations of the LC system include, but are not limited to, HPLC and UPLC systems. The chromatography system 10 includes a solvent delivery system 12 in fluidic communication with a valve manager (VM) 14 through tubing 16. Generally, the solvent delivery system 12 includes pumps (not shown) in fluidic communication with solvent reservoirs 18 from which the pumps draw solvents. In one embodiment, the solvent delivery system 12 is a binary solvent manager (BSM), which uses two individual serial flow pumps to draw solvents from their reservoirs 18 and deliver a solvent composition to the VM 14. An example implementation of a BSM is the ACQUITY® UPLC Binary Solvent Manager, manufactured by Waters Corp. of Milford, Mass. The pumps of the BSM are capable of generating pressure as high as 18K psi (pounds per square inch). Hereafter, for purposes of illustration by example, the solvent delivery system 12 may be referred to as a BSM 12 or LC pump 12.

The VM 14 is in fluidic communication with a sample manager (SM) 20 by tubing 22 and 24 to enable the adding of volume to the chromatography system 10 without having to re-qualify the system configuration, as described in more detail later. Solvent composition (or gradient) arriving from the BSM 12 through tubing 16 passes through the VM 14 to the SM 20 by tubing 22. Tubing 24 carries the solvent composition with the injected sample (i.e., mobile phase or sample composition) from the SM 20 to the VM 14. The VM 14 is also in fluidic communication with a column manager (CM) 26 by tubing 28 by which the solvent composition with the injected sample passes to a column (not shown). Implementation of the VM 14 may be at the BSM 12; that is, the BSM 12 conventionally has a vent valve that is replaced with the VM 14 (or just the first valve 40 (FIG. 2) the VM 14). Except for changes to the plumbing, the VM 14 can reuse the valve drive previously used to operate the vent valve.

The SM 20 is in fluidic communication with a sample source 30 from which the SM 20 acquires a sample. The sample source 30 can be, for example, a vial containing the sample, or a process line, from which the sample manager 20 acquires and introduces a sample to the solvent composition arriving from the valve manager 14. An example implementation of the sample manager 20 is the ACQUITY® FTN Sample Manager, manufactured by Waters Corp, of Milford, Mass.

The CM 26 generally provides a controlled temperature environment for one or more chromatography separation columns used in separating sample-solvent compositions. Each separation column is adapted to separate the various components (or analytes) of the sample from each other as the mobile passes through, and to elute the analytes carried by the mobile phase) from the column at different times. From the column manager 26, the constituents of the separated sample pass to a detector 32 or other equipment, for example, a mass spectrometer or a Flame Ionization Detector (HD), for analyzing the separation.

The chromatography system 1 further includes a data system 34 that is in signal communication with the BSM 12, the VM 14, column manager 26, detector 32, and the SM 20. The data system 34 has a processor and a switch (e.g., an Ethernet switch) for handling signal communication among the BSM 12, the VM 14, and SM 20. In addition, the processor of the data system 34 is programmed to implement the various phases of operation performed by the VM (controlling a valve drive to rotate one or more valves) and the SM (e.g., turning pumps on and off, rotating a valve) in order to inject the sample to a solvent composition stream, as described herein. In addition, a host computing system 36 is in communication with the data system 34, by which personnel can run qualifications of the LC system 10, store results of the qualifications, and download various parameters and profiles to affect the data system's performance. For example, during a qualification of the LC system 10, the data system 34 can automatically place the VM 14 in a first configuration, qualify the LC system with the VM 14 in that first configuration, change the VM 14 into a second configuration, and qualify the LC system with the VM 14 in that second configuration. The results of both qualifications can be stored in a database, and subsequently used to check the performance of the LC system. Further, subsequent automated switching of the VM 14 from the first configuration to the second configuration, or the second configuration to the first configuration, does not require a requalification of the LC system 10.

The solvent delivery system 12, VM 14, SM 20, CM 26, detector 32, and data system 34 may be separate instruments or integrated into a single unit.

Figure 2:
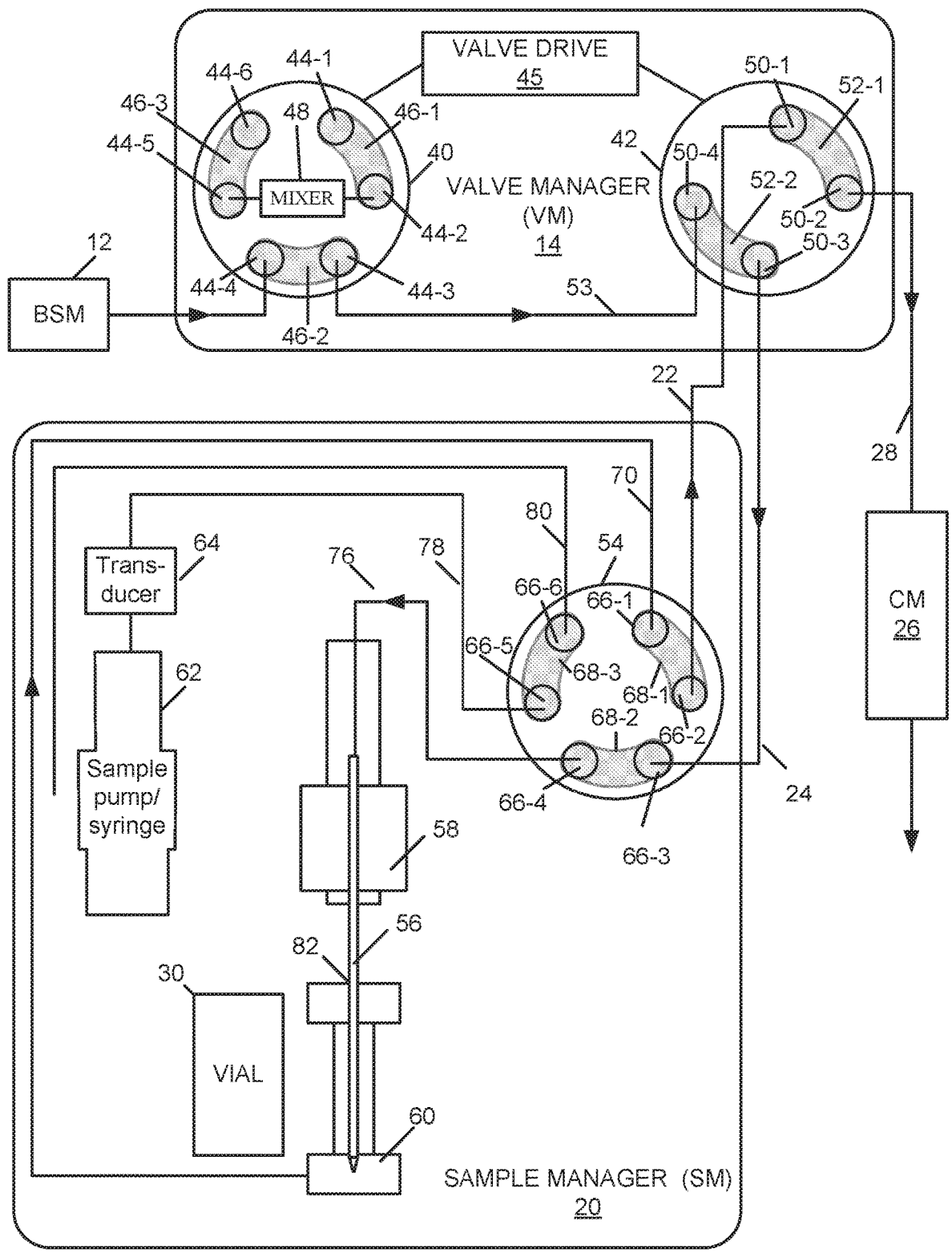
FIG. 2 is a diagram of an embodiment of a valve manager capable of automatically changing the system volume of the LC system, sample dispersion volume, or both, without requiring a subsequent requalification of the LC system as a result of the change, the valve manager being in a first selectable configuration in communication with an embodiment of a sample manager of the LC system.

FIG. 2 shows an embodiment the valve manager 14 in communication with an embodiment of the sample manager 20. The VM 14 includes a first valve 40 in fluidic communication with a second valve 42. Each valve 40, 42 is a rotary shear valve having a rotor fitted to a stator; the rotor rotates, while the stator is the stationary part of the valve. In general, the rotor has a plurality of arcuate flow-through channels or grooves circularly arranged in the rotor, and the stator has a plurality of stator ports symmetrically disposed around a radius of the stator. Each groove of the rotor connects two or more adjacent stator ports; which stator ports are actually connected to each other depends upon the position of the rotor. In general, the first valve 40 enables the addition of system volume to the LC system 10; the second valve 42 enables the addition of sample dispersion volume to the LC system 10 by changing the flow direction through the sample manager 20.

The first valve 40 of the VM 14 has six stator ports 44-1, 44-2, 44-3, 44-4, 44-5, and 44-6 (generally, 44) and three rotor channels 46-1, 46-2, and 46-3 (generally, 46). In the configuration shown, rotor channel 46-1 connects stator ports 44-1 and 44-2; rotor channel 46-2 connects stator ports 44-3 and 44-4; and rotor channel 46-3 connects stator ports 44-5 and 44-6. The stator port 44-4 is connected to the BSM 12. Connected between stator ports 44-2 and 44-5 is a mixer 48.

The second valve 42 of the VM 14 has four stator ports 50-1, 50-2, 50-3, and 50-4, (generally, 50) and two rotor channels 52-1 and 52-2 (generally, 52). In the configuration shown, rotor channel 52-1 connects stator ports 50-1 and 50-2 and rotor channel 52-2 connects stator ports 50-3 and 50-4. Tubing 28 connects the stator port 50-2 to the column manager 26; and tubing 53 connects the stator port 50-4 to the stator port 44-3 of the first valve 40. In general, the first valve 40 determines whether the volume of the mixer 48 is added to the system volume; whereas the second valve 42 determines the direction of gradient flow through the sample manager 20. The direction of gradient flow through the sample manager 20 determines the sample injection dispersion.

Other embodiments of the valve manager 14 may have only one of the two valves, for example, only the first valve 40 or only the second valve 42. Connected to each of the valves 40, 42 is a valve drive 45 for automatically rotating either or both valves under the control of the data system 34 (FIG. 1). The valve drive 45 is omitted from the remainder of the FIGS. in this description to simplify the illustrations.

The SM 20 includes an injection valve 54, a flow-through needle (FTN) 56, a needle drive 58, a seat 60, a pressure source 62, a transducer 64, and a sample source 30 (here, e.g., a vial).

The injection valve 54 has six ports 66-1, 66-2, 66-3, 66-4, 66-5, and 66-6 (generally, 66) and three rotor channels 68-1, 68-2, and 68-3 (generally, 68). In the configuration shown, channel 68-1 connects stator ports 66-1 and 66-2; rotor channel 68-2 connects stator ports 66-3 and 66-4; and rotor channel 68-3 connects stator ports 66-5 and 66-6.

The six ports 66 of the injection valve 54 are connected to the various components of the SM 20 and the second valve of the VM 14 as follows: tubing 70 connects port 66-1 to an exit port of the seat 60; tubing 22 (FIG. 1) connects port 66-2 to the stator port 50-1 of the second valve 42 of the VM 14; tubing 24 (FIG. 1) connects port 66-3 to the stator port 50-3 of the second valve 42 of the VM 14;

tubing 76 connects port 66-4 to the entry end of the needle 56; tubing 78 connects port 66-5 to the transducer 64; and tubing 80 connects port 66-6 to waste.

In general, the needle 56 is part of the sample loop of the SM 20; the tubing 76, 70 and seat 60 complete the sample loop from port 66-4 to port 66-1. The injection needle 56 has a tip that moves in and out of an injection port 82 of the seat 60 under the control of the needle drive 58. The seat 60 produces a leak-proof seal when the needle tip enters therein. In addition to controlling the movement and position of the injection needle 56 (into and out of the injection port 82), the needle drive 58 can also move the injection needle 56 in an angular direction (theta motion) between the vial 30 and the injection port 82.

The pressure source 62 produces a prescribed amount of pressure, which is measured by the transducer 64. This pressure source 62 can be a unidirectional or bidirectional peristaltic pump or a milliGAT pump, or a syringe.

During operation of the LC system 10, with the VM 14 in the configuration shown in FIG. 2, the BSM 12 pumps gradient into the stator port 44-4 of the first valve 40. From the stator port 44-4, the gradient passes through the rotor channel 46-2 and exits the first valve 40 through stator port 44-3. Passing through tubing 53, the gradient arrives at the stator port 50-4 of the second valve 42. The gradient then passes through the rotor channel 52-2 to exit the second valve 42 through stator port 50-3. From the stator port 50-3, the gradient exits the second valve 42 and the valve manager 14 for delivery through tubing 24 to the stator port 66-3 of the valve 54 of the sample manager 20. In this configuration, the volume of the mixer 48 is not in the flow path and, thus, not included in the system volume.

After entering the stator port 66-3 of the valve 54 of the sample manager 20, the gradient passes through rotor channel 68-2 and exits the valve 54 through stator port 66-4. The gradient then passes through tubing 76, the flow-through needle 56, the fluidic tee (seat 60), and the tubing 70 to return to the valve 54 at stator port 66-1. When passing through the flow-through needle 56, the gradient picks and moves a sample to become a sample composition. From the stator port 66-1, the sample composition (or mobile phase) passes through the rotor channel 68-1 to exit the valve 54 through stator port 66-2. Passing through tubing 22, the sample composition arrives at stator port 50-1 of the second valve 42. From the stator port 50-1, the mobile phase passes through rotor channel 52-1 and exits the second valve 42 and valve manager 14 through the stator port 50-2 on the path through tubing 28 to the column manager 26.

Figure 3:
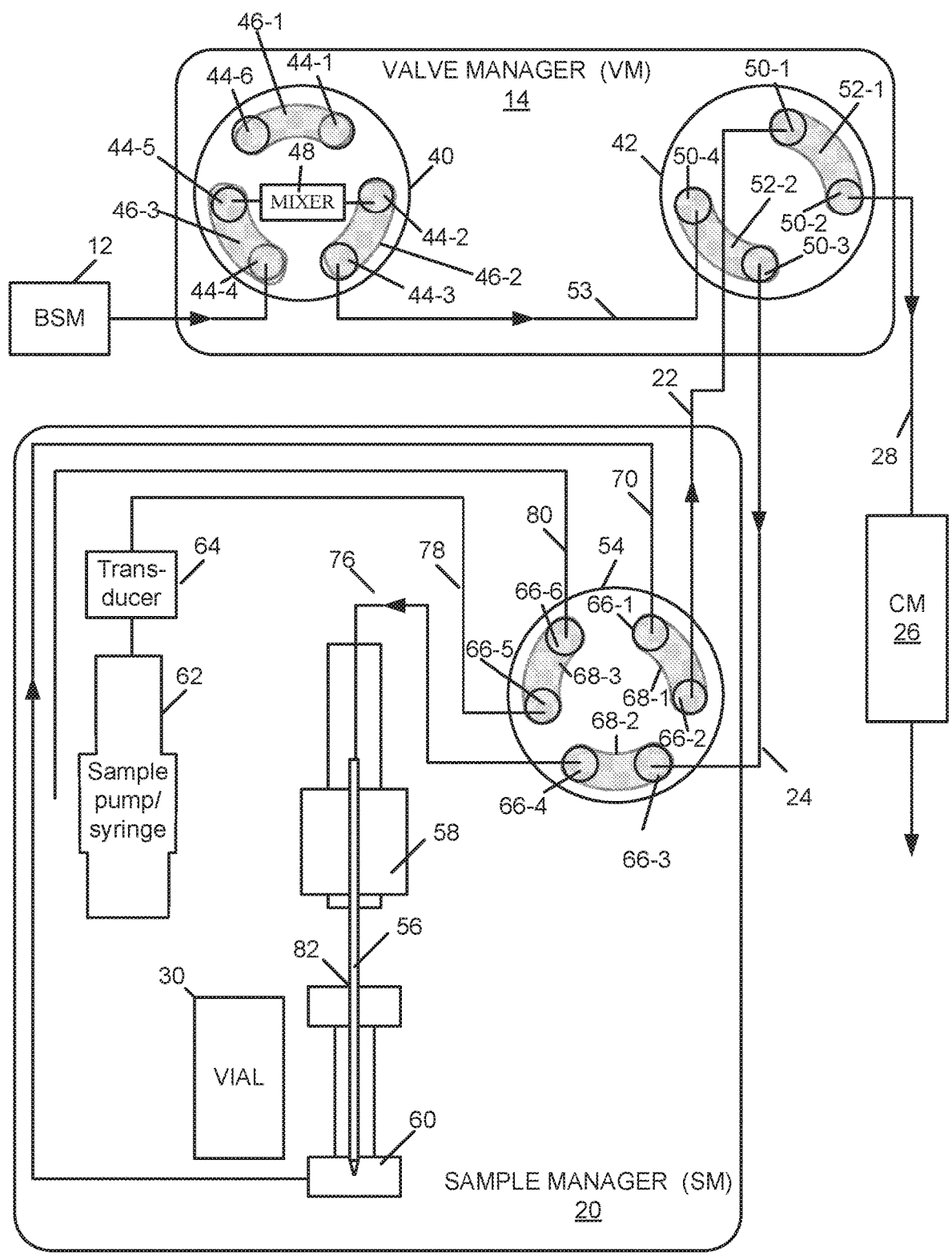
FIG. 3 is a diagram of the valve manager of FIG. 2 in communication with the sample manager, wherein the valve manager is in a second, selectable configuration that adds the volume of a mixer to the system volume of the LC system without requiring a subsequent requalification of the LC system as a result of the change.

FIG. 3 shows a second configuration of the valve manager 14 in communication with the embodiment of the sample manager 20 of FIG. 2. The tubing connections between stator ports of the first and second valves 40, 42, and between stator ports of the valve manager 14 and sample manager 20, are the same, as those described in FIG. 2. In this second configuration, the rotor of the first valve 40 of the valve manager 14 is turned, by one step, counterclockwise from the position shown in FIG. 2, so that the mixer 48 connected between stator ports 44-5 and 44-2 is added to the flow path of the gradient being pumped by the BSM 12. (The rotor of the first valve 40 can turn clockwise by one step to achieve connections between the same pair of stator ports.) The flow path passes through the rotor channel 46-3 connecting stator ports 44-4 and 44-5, the mixer 48, and the rotor channel 46-2 connecting stator ports 44-2 and 44-3. The rotor channel connections for the second valve 42 of the flow manager and injection valve 54 of the sample manager 20, and the direction of fluidic flow through the second valve 42 and sample manager 20 towards the column manager 26 are unchanged from that shown in FIG. 2.

Accordingly, by automatically moving the first valve 40 into the position, as shown in FIG. 3, the volume of the mixer 48 becomes part of the overall system volume of the LC system 10, A variety of commercially available mixers, having a range of mixing volumes, enables a technician to select a mixer of the desired volume when configuring the valve manager 14 (prior to qualification). The selected volume of the mixer 48 can then alter the system volume of the LC system 10 to match closely the system volume of a legacy LC system, thereby enabling methods previously performed on the legacy LC system to run unaltered on the LC system 10.

Figure 4:
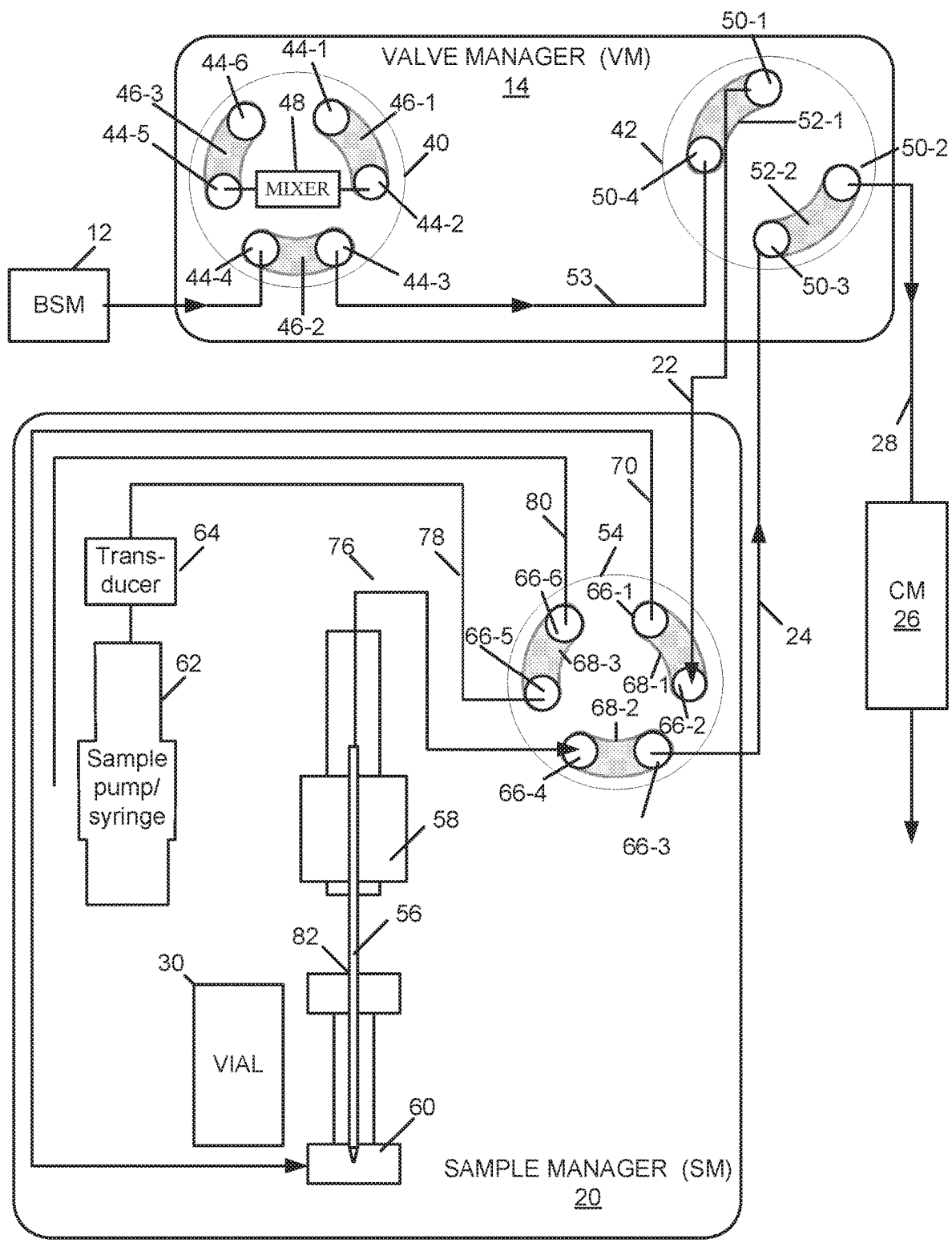
FIG. 4 is a diagram of the valve manager of FIG. 2 in communication with the sample manager of FIG. 2, wherein the valve manager is in a third, selectable configuration that increases a sample dispersion volume of the LC system by reversing the direction of gradient flow through the sample manager from the flow direction shown in FIG. 2 and FIG. 3.

FIG. 4 shows a third configuration of the valve manager 14 in communication with the sample manager 20 of FIG. 2. The tubing connections between stator ports of the first and second valves 40, 42, and between stator ports of the valve manager 14 and sample manager 20, are the same as those described in FIG. 2. In this configuration, the position of the first valve 40 matches the position of FIG. 2, whereas the rotor of the second valve 42 is turned, by one step, counterclockwise from its position shown in FIG. 2 so that or channel 52-1 connects stator ports 50-4 and 50-1 and the rotor channel 52-2 connects stator ports 50-2 and 50-3. (The rotor can turn clockwise by one step to achieve connections between the same pairs of stator ports.)

During operation of the LC system 10 in the configuration shown in FIG. 4, the BSM 12 pumps gradient into the stator port 44-4 of the first valve 40. From the stator port 44-4, the gradient passes through the rotor channel 46-2 and exits the first valve 40 through stator port 44-3. Passing through tubing 53, the gradient arrives at the stator port 50-4 of the second valve 42. Up to this point, the flow direction has been the same as that described in connection with FIG. 2, and the volume of the mixer 48 is not in the flow path and, thus, not included in the system volume, From the stator port 50-4, the gradient then passes through the rotor channel 52-1 to exit the second valve 42 through stator port 50-1. From the stator port 50-1, the gradient exits the second valve 42 and the valve manager 14 for delivery through tubing 22 to the stator port 66-2 of the valve 54 of the sample manager 20. By entering the valve 54 through the stator port 66-2, the direction of flow through the sample manager 20 is the reverse of the flow direction described in connection with FIG. 2. This reverse flow through the sample manager 20 increases the sample dispersion (i.e., the body of the flow-through needle 56 provides a greater volume within which the injected sample can mix than the volume of the tubing 70 in the forward direction). Advantageously, because both the forward and reverse flow configurations can be qualified automatically, switching between the two configurations does not require a time-consuming requalification.

Specifically, after entering the stator port 66-2 of the valve 54, the gradient passes through rotor channel 68-1 and exits the valve 54 through stator port 66-1. The gradient then passes through tubing 70, the seat 60, into the tip of the flow-through needle 56 (where it picks up the sample), and out through the tubing 76, to return to the valve 54 at stator port 66-4.

From the stator port 66-4, the mobile phase with the sample (also referred to as the sample composition) passes through the rotor channel 68-2 to exit the sample manager valve 54 through the stator port 66-3. Passing through tubing 24, the sample composition arrives at stator port 50-3 of the second valve 42. From the stator port 50-3, the sample composition passes through rotor channel 52-2 and exits the second valve 42 (and valve manager 14) through the stator port 50-2, onwards through tubing 28 to the column manager 26.

Figure 5:
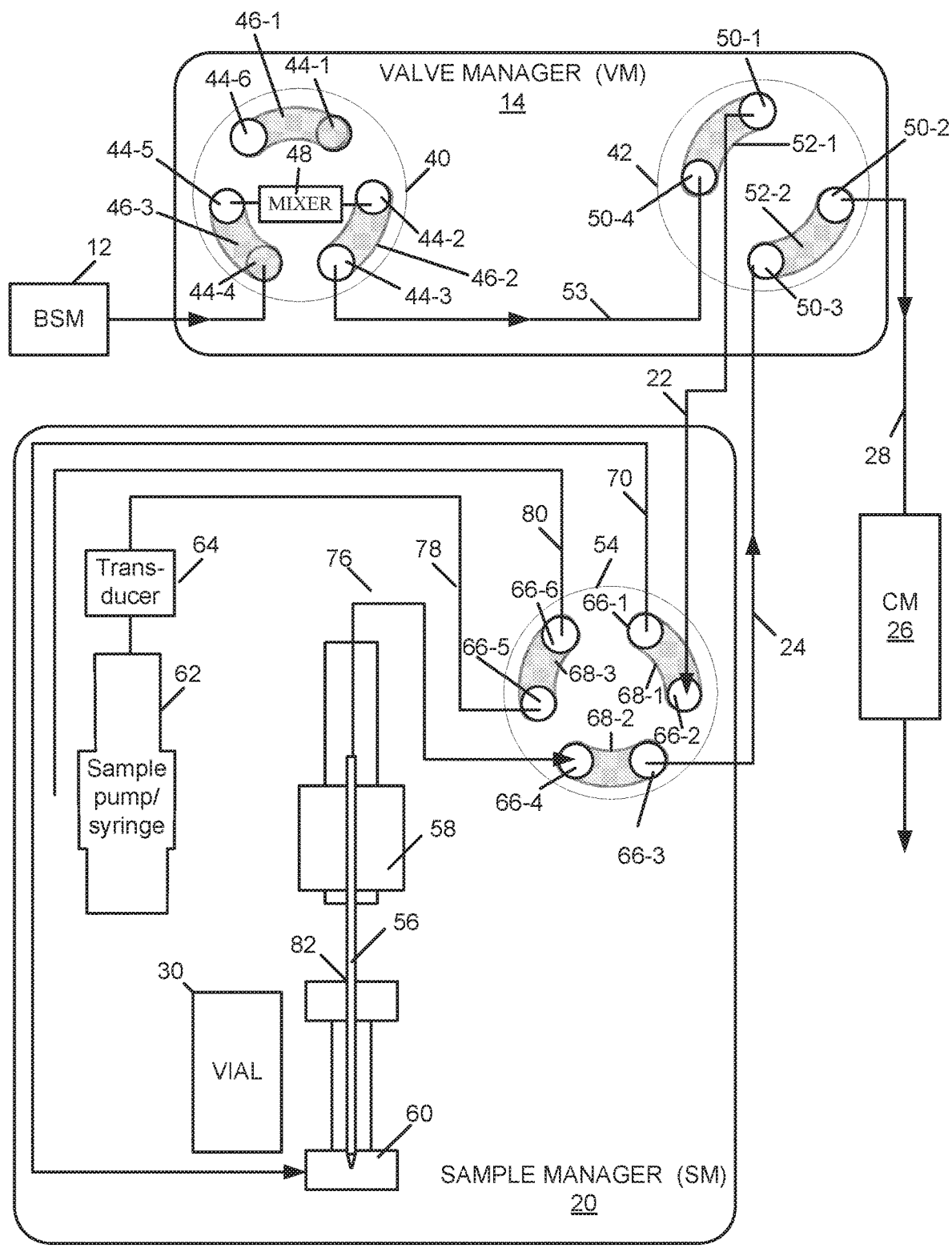
FIG. 5 is a diagram of the valve manager of FIG. 2 in communication with the sample manager of FIG. 2, wherein the valve manager is in a fourth, selectable configuration that adds the volume of a mixer to the system volume of the LC system and increases a sample dispersion volume of the LC system by reversing the direction of gradient flow through the sample manager, such as described in connection with FIG. 4.

FIG. 5 shows a fourth configuration of the valve manager 14 in communication with the sample manager of FIG. 2. The tubing connections between stator ports of the first and second valves 40, 42, and between stator ports of the valve manager 14 and sample manager 20, are the same as those described in FIG. 2, In this configuration, the position of the first valve 40 is the same as the position of the first valve 40 in FIG. 3, and the position of the second valve 42 is the same as the position of the first valve 40 in FIG. 4. In the fourth configuration, the first valve 40 places the mixer 48 in the path of the gradient flow, and the second valve 42 reverses the gradient flow through the sample manager 20, as described in connection with FIG. 4. Accordingly, in comparison with the first configuration of FIG. 2, the fourth configuration enables the addition of system volume to the LC system 10 by virtue of switching the mixer 48 into to the flow path and to increase the sample dispersion volume by reversing the flow through the sample manager.

Figure 6:
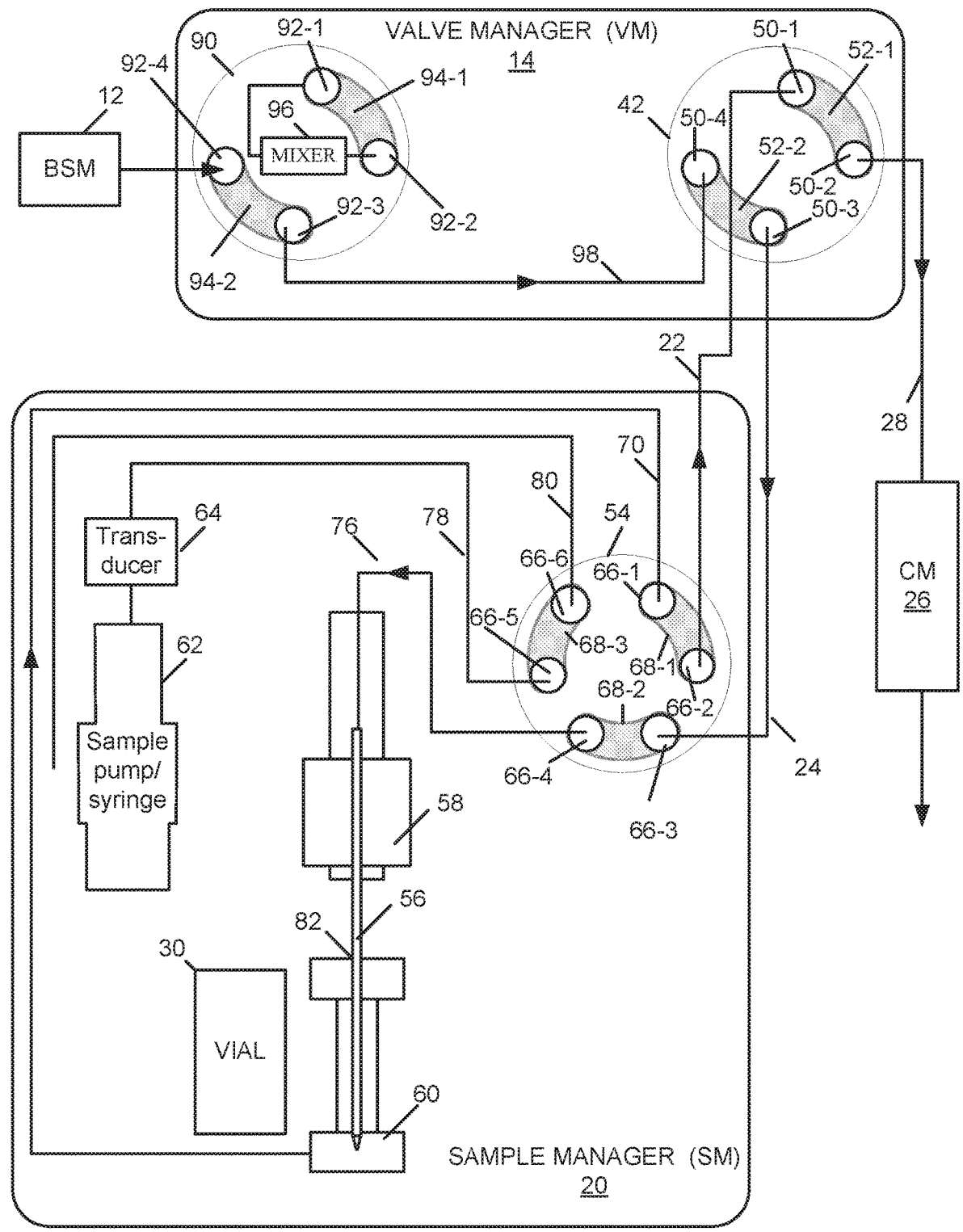
FIG. 6 is a diagram of another embodiment of a valve manager capable of automatically changing the system volume of the LC system, sample dispersion volume, or both, without requiring a subsequent requalification of the LC system as a result of the change, the valve manager having two four-port valves, one of which determines whether a mixer is added to the flow path and the other determining a direction of flow through the sample manager.

FIG. 6 shows a second embodiment of the valve manager 14 in communication with the sample manager 20 of FIG. 2. In this embodiment, the first valve 90 of the VM 14 is a four-port rotary valve, like the second valve 42. The first valve 90 has four stator ports 92-1, 92-2, 92-3, and 92-4 (generally, 92) and two rotor channels 94-1 and 94-2 (generally, 94). Rotor channel 94-1 connects stator ports 92-1 and 92-2; and rotor channel 94-2 connects stator ports 92-3 and 92-4. The stator port 92-4 is connected to the BSM 12. Connected between stator ports 92-1 and 92-2 is a mixer 96.

The second valve 42 of the VM 14 and the sample manager 20, and the stator port connections therebetween, are the same as those described in connection with FIG. 2. Tubing 98 connects the stator port 50-4 of the second valve 42 to the stator port 92-3 of the first valve 90.

The valve manager 14 in FIG. 6 is in a first configuration, wherein the first valve 90 bypasses the mixer 96 and the second valve 42 establishes a forward direction gradient flow through the sample manager 20.

During operation of the LC system 10 in the configuration shown in FIG. 6, the BSM 12 pumps gradient into the stator port 92-4 of the first valve 90. From the stator port 92-4, the gradient passes through the rotor channel 94-2 and exits the first valve 90 through stator port 92-3. Passing through tubing 98, the gradient arrives at the stator port 50-4 of the second valve 42. The gradient then passes through the rotor channel 52-2 to exit the second valve 42 through stator port 50-3. From the stator port 50-3, the gradient exits the second valve 42 and the valve manager 14 for delivery through tubing 24 to the stator port 66-3 of the injection valve 54 of the sample manager 20. The gradient then passes through the sample manager 20 in the forward direction, as described in connection with FIG. 2, entering a proximal end (opposite the tip) of the flow-through needle 56, where it picks up a sample, and returns to the second valve 42 through stator port 50-1. From the stator port 50-1, the sample composition passes through rotor channel 52-1 and exits the second valve 42 and the valve manager 14 through the stator port 50-2 on the path through tubing 28 to the column manager 26.

In a second configuration of the valve manager 14 of FIG. 6, the position of the first valve 90 places the mixer 96 into the path of the gradient flow coming from the BSM 12, and the position of the second valve 42 establishes a forward direction flow through the sample manager 20.

In a third configuration of the valve manager 14, the position of the first valve 90 causes the gradient flow coming from the BSM 12 to bypass the mixer 96 (like the first configuration), and the position of the second valve 42 establishes a reverse direction flow through the sample manager 20 (like the third configuration described in FIG. 4).

In a fourth configuration of the valve manager 14, the position of the first valve 90 places the mixer 96 into the path of the gradient flow coming from the BSM 12, and the position of the second valve 42 establishes a reverse direction flow through the sample manager 20.

Figure 7:
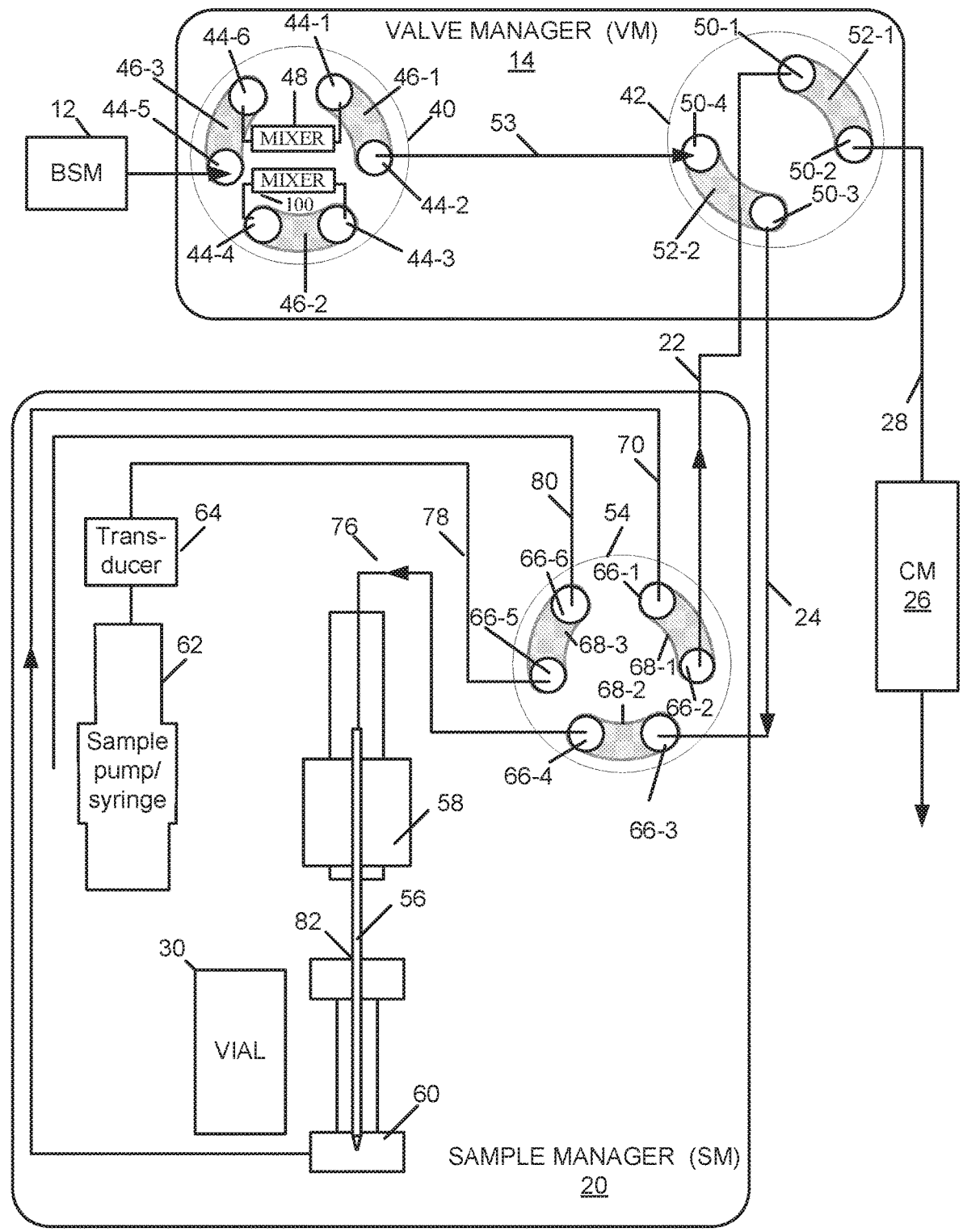
FIG. 7 is a diagram of another embodiment of a valve manager capable of automatically changing the system volume of the LC system, sample dispersion volume, or both, without requiring requalification of the LC system as a result of the change, the valve manager having a six-port valve and a four-port valve, the six-port valve determining which of two mixers is added to the flow path and the four-port valve determining a direction of flow through the sample manager.

FIG. 7 shows a third embodiment of the valve manager 14 in communication with the sample manager 20 of FIG. 2. This embodiment is the same as the embodiment of the valve manager 14 in FIG. 2, except for the particular placement of the mixer 48 and the addition of a second mixer 100. In this embodiment, the mixer 48 is disposed between the stator ports 44-1 and 44-6 (in FIG. 2, it was between stator ports 44-2 and 44-5). The additional mixer 100 is disposed between stator ports 44-3 and 44-4. Some tubing connections are also different from those in FIG. 2: the BSM 12 is connected to the stator port 44-5 of the first valve 40; and the tubing 53 connects the stator port 44-2 of the first valve 40 to the stator port 50-4 of the second valve 42 (in FIG. 2, stator ports 44-3 is connected to stator port 50-4). The stator port connections between the second valve 42 of the VM 14 and the sample manager 20 are the same as those described in connection with FIG. 2.

The first valve 40 determines which of the two mixers 48, 100 is placed in the path of the gradient flowing from the BSM 12. The two mixers 48, 100 provide different volumes that can be selectively added to the system volume. The second valve 42 determines the flow direction, forward or reverse, through the sample manager 20.

As shown in FIG. 7, the valve manager 14 is in a first configuration where the position of the first valve 40 places the mixer 48 into the path of the gradient flow coming from the BSM 12, and the position of the second valve 42 establishes a forward direction flow through the sample manager 20.

In a second configuration of the valve manager 14 of FIG. 7, the position of the first e 40 places the other mixer 100 into the path of the gradient flow coming from the BSM 12, and the position of the second valve 42 establishes a forward direction flow through the sample manager 20.

In a third configuration of the valve manager 14, the position of the first valve 40 places the mixer 48 into the path of the gradient flow coming from the BSM 12, while the position of the second valve 42 establishes a reverse direction flow through the sample manager 20.

In a fourth configuration of the valve manager 14, the position of the first valve 40 places the other mixer 100 into the path of the gradient flow coming from the BSM 12, and the position of the second valve 42 establishes a reverse direction flow through the sample manager 20.

Advantageously, each of these configurations can be initially qualified and, therefore, any change in selection among the four configurations does not require a subsequent requalification as a result of the change.

Figure 8:
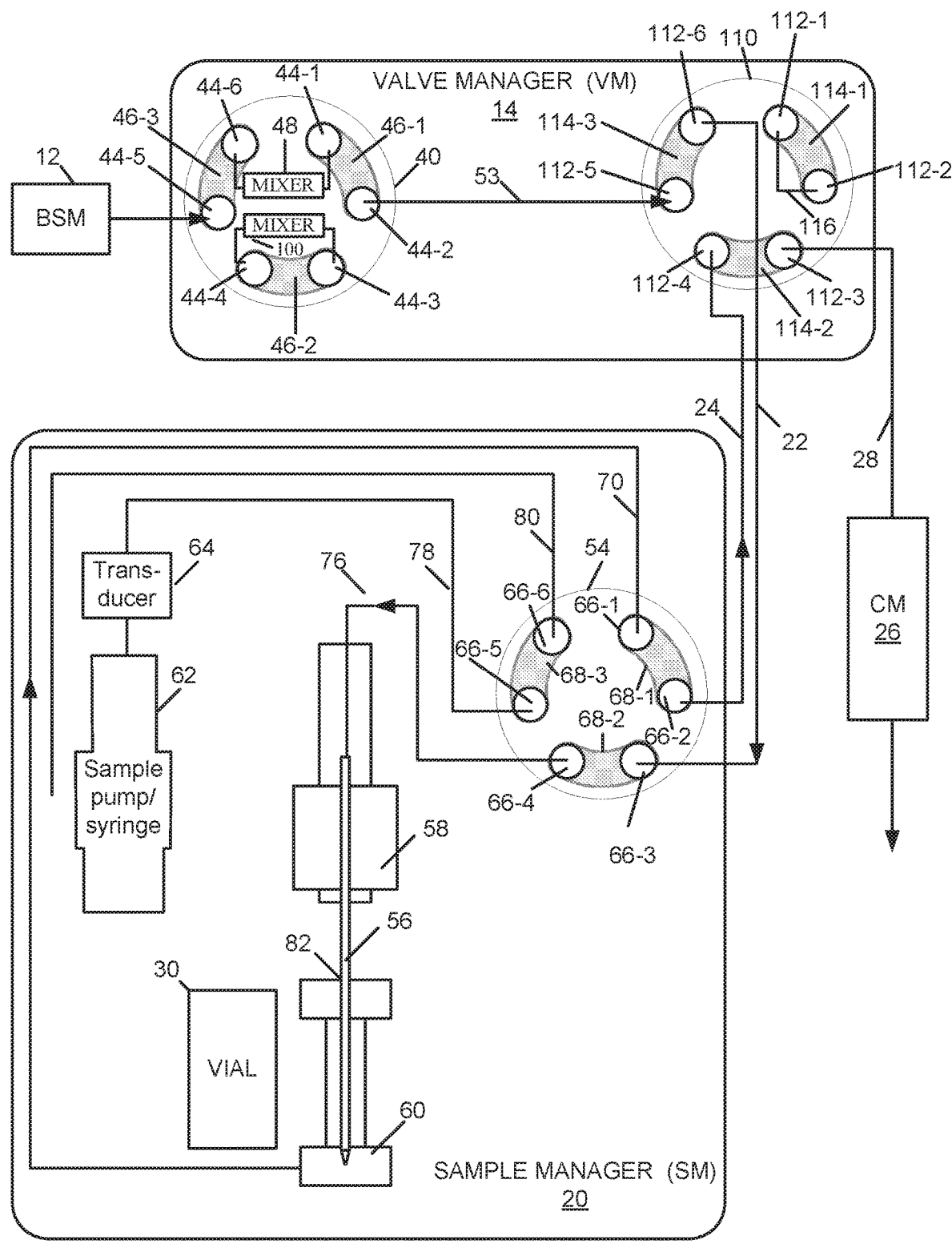
FIG. 8 is a diagram of another embodiment of a valve manager capable of automatically changing the system volume of the LC system, sample dispersion volume, or both, without requiring requalification of the LC system as a result of the change, the valve manager having two six-port valves, one of which determines which of two mixers is added to the flow path and the other determines a direction of flow through the sample manager.

FIG. 8 shows a fourth embodiment of the valve manager 14 in communication with the sample manager 20 of FIG. 2. In this embodiment, the sample manager 20 and the first valve 40 of the VM 14, including the two mixers 48, 100, are the same as the sample manager 20 and first valve 40 described in connection with FIG. 7, and the second valve 110 of the VM 14 is a six-port rotary valve, like the first valve 40. The BSM 12 is connected to the stator port 44-5 of the first valve 40, The second valve 110 has six stator ports 112-1, 112-2, 112-3, 112-4, 112-5, and 112-6 (generally, 112) and three rotor channels 114-1, 114-2, and 114-3 (generally, 114). Rotor channel 114-1 connects stator ports 112-1 and 112-2; rotor channel 114-2 connects stator ports 112-3 and 112-4; and rotor channel 114-3 connects stator ports 112-5 and 112-6. Stator port 112-1 is connected to stator port 112-2 by tubing 116. Tubing 53 connects the stator port 44-2 of the first valve 40 to the stator port 112-5 of the second valve 110.

Stator port 112-6 of the second valve 110 is connected stator port 66-3 of the sample manager valve 54 by tubing 22; stator port 112-4 of the second valve 110 is connected to stator port 66-2 of the sample manager valve 54 by tubing 24; and stator port 112-3 is connected to the column manager 26 by tubing 28.

Like the embodiment of FIG. 7, in the embodiment of FIG. 8, the first valve 40 determines which of the two mixers 48, 100 is placed in the path of the gradient flowing from the BSM 12, and the second valve 110 determines the flow direction, forward or reverse, through the sample manager 20. Although the two mixers 48, 100 have the same reference numbers in FIG. 7 and FIG. 8, in practice, the volumes of the mixers 48, 100 in FIG. 7 can have the same or different volumes from corresponding mixers 48, 100 in FIG. 8.

In FIG. 8, the valve manager 14 is in a first configuration where the position of the first valve 40 places the mixer 48 into the path of the gradient flow coming from the BSM 12, and the position of the second valve 110 establishes a forward direction flow through the sample manager 20.

In a second configuration, the position of the first valve 40 places the other mixer 100 into the path of the gradient flow coming from the BSM 12, and the position of the second valve 110 establishes a forward direction flow through the sample manager 20.

In a third configuration, the position of the first valve 40 places the mixer 48 into the path of the gradient flow coming from the BSM 12, while the position of the second valve 110 establishes a reverse direction flow through the sample manager 20.

In a fourth configuration, the position of the first valve 40 places the other mixer 100 into the path of the gradient flow coming from the BSM 12, and the position of the second valve 110 establishes a reverse direction flow through the sample manager 20.

Each of these configurations can be initially qualified and, therefore, any change in selection among the four configurations does not require a subsequent requalification as a result of the change.

Figure 9:
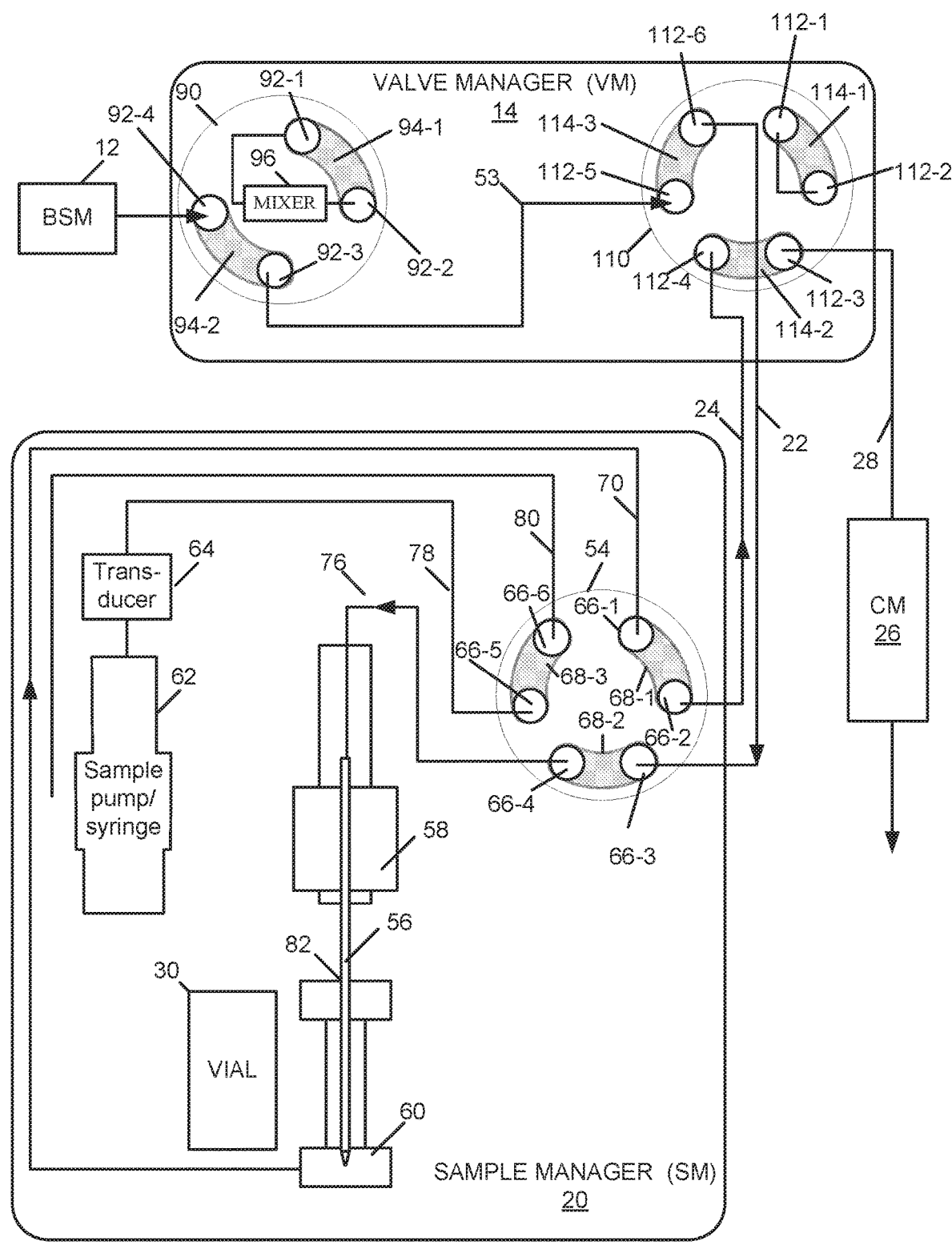
FIG. 9 is a diagram of another embodiment of a valve manager capable of automatically changing the system volume of the LC system, sample dispersion volume, or both, the valve manager having a six-port valve and a four-port valve, the four-port valve determining whether a mixer is added to the flow path and the six-port valve determining a direction of flow through the sample manager.

FIG. 9 shows a fifth embodiment of the valve manager 14 in communication with the sample manager 20 of FIG. 2. In this embodiment, the VM 14 has the same four-port first valve 90, including the mixer 96, as that described in FIG. 6, and the same six-port second valve 110, as that described in FIG. 8. The stator port 92-4 of the first valve 90 is connected to the BSM 12. Tubing 53 connects the stator port 92-3 of the first valve 90 to the stator port 112-5 of the second valve 110. The tubing connections between the second valve 110 and the sample manager valve 54 are the same as those described in FIG. 8.

The first valve 90 determines whether the mixers 96 is placed in the path of the gradient flowing from the BSM 12, and the second valve 110 determines the flow direction, forward or reverse, through the sample manager 20. In the configuration shown, the position of the first valve 90 bypasses the mixer 96, and that of the second valve 110 produces a forward direction flow through the sample manager 20, Other configurations include a forward direction flow with the mixer 96 in the flow path, a reverse direction flow with the mixer 96 in the flow path, and a reverse direction flow with the mixer 96 bypassed.

Figure 10:
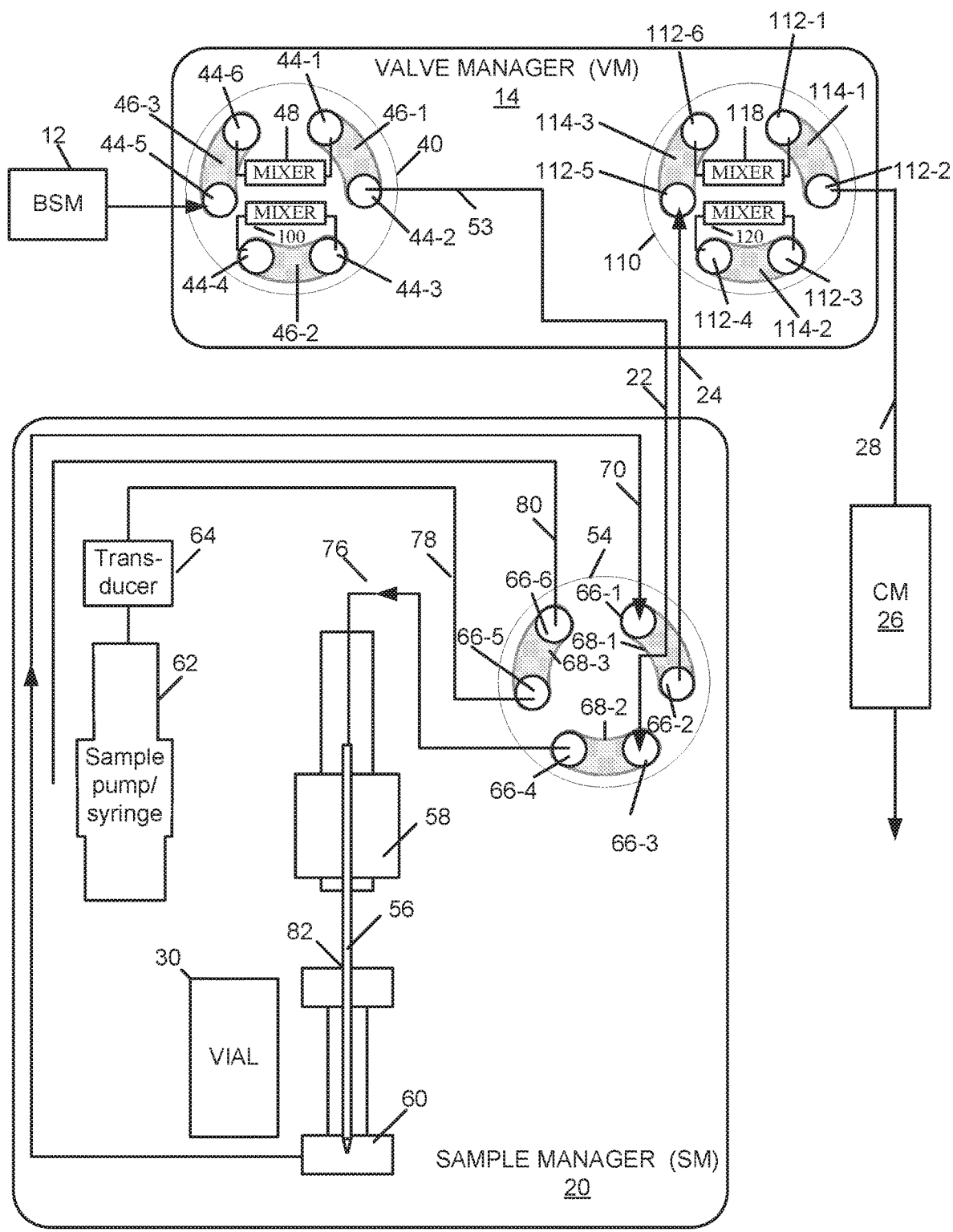
FIG. 10 is a diagram of another embodiment of a valve manager capable of automatically changing the system volume of the LC system, sample dispersion volume, or both, the valve manager having two six-port valves, one of which determines which of two mixers is added to a flow path upstream of the sample manager and the other determines which of two mixers is added to the flow path downstream of the sample manager.

FIG. 10 shows a sixth embodiment of the valve manager 14 in communication with the sample manager 20 of FIG. 2. This embodiment the valve manager 14 is the same as that described in FIG. 8, except the second valve 110 is configured with two mixers 118, 120 of different volumes, and the different tubing connections between the VM 14 and the sample manager 20. The mixer 118 is connected between stator ports 112-1 and 112-6 of the second valve 110; and the mixer 120 is connected between stator ports 112-3 and 112-4 of the second valve 110. Tubing 22 connects the stator port 44-2 of the first valve 40 with the stator port 66-3 of the sample manager valve 54; tubing 24 connects stator port 112-5 of the second valve 110 to the stator port 66-2 of the sample manager valve 54; and tubing 28 connects stator port 112-2 to the column manager 26.

The embodiment of valve manager 14 in FIG. 10 can produce forward direction gradient flow only through the sample manager 20. The first valve 40 determines which of the two mixers 48, 100 is placed in the path of the gradient flowing from the BSM 12, and the second valve 110 determines which of the two mixers 118, 120 is placed in the path of the sample composition flow arriving from the sample manager 20. The two mixers 48, 100 determine changes to the system volume, whereas the two mixers 118, 120 determine changes to the sample dispersion volume. There are four different combination of mixers used to add volume to the LC system 10: 1) mixers 48 and 118 as shown; 2) mixers 48 and 120; 3) mixers 100 and 118; and 4) mixers 100 and 120. Each of these configurations can be initially qualified and, therefore, any change in selection among the four configurations does not require a subsequent qualification.

Figure 11:
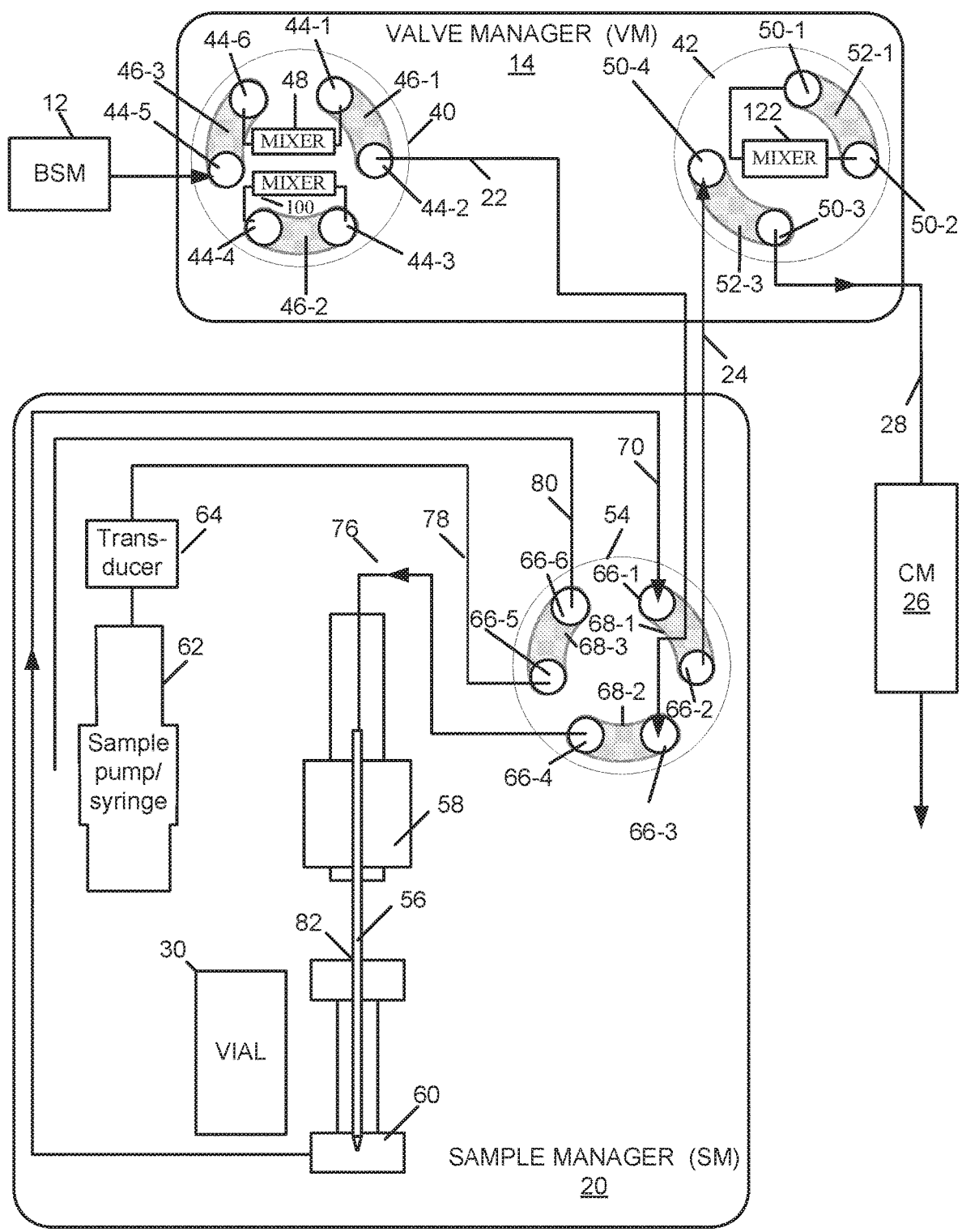
FIG. 11 is a diagram of another embodiment of a valve manager capable of automatically changing the system volume of the LC system, sample dispersion volume, or both, the valve manager having a six-port valve and a four-port valve, the six-port valve determining which of two mixers is added to a flow path upstream of the sample manager and the four-port valve determining whether a mixer is added to the flow path downstream of the sample manager.

FIG. 11 shows a seventh embodiment of the valve manager 14 in communication with the sample manager 20 of FIG. 2. This embodiment the valve manager 14 is the same as that described in FIG. 7, except the second valve 42 is configured with one mixer 122, and the tubing connections between the VM 14 and the sample manager 20. The mixer 122 is connected between stator ports 50-1 and 50-2 of the second valve 42. Tubing 22 connects the stator port 44-2 of the first valve 40 with the stator port 66-3 of the sample manager valve 54; tubing 24 connects stator port 50-4 of the second valve 42 to the stator port 66-2 of the sample manager valve 54; and tubing 28 connects stator port 50-3 to the column manager 26.

The embodiment of valve manager 14 in FIG. 11 can produce forward direction gradient flow only through the sample manager 20. The first valve 40 determines which of the two mixers 48, 100 is placed in the path of the gradient flowing from the BSM 12, and the second valve 42 determines whether the mixer 122 is placed in the path of the sample composition flow arriving from the sample manager 20. The two mixers 48, 100 determine changes to the system volume, whereas the mixer 122 can be used to change to the sample dispersion volume. There are four different combination of mixers used to add volume to the LC system 10: 1) mixer 48 only, as shown; 2) mixers 48 and 122; 3) mixers 100 and 122; and 4) mixer 100 only. Each of these configurations can be initially qualified and, therefore, any change in selection among the four configurations does not require a subsequent requalification as a result of the change.

Figure 12:
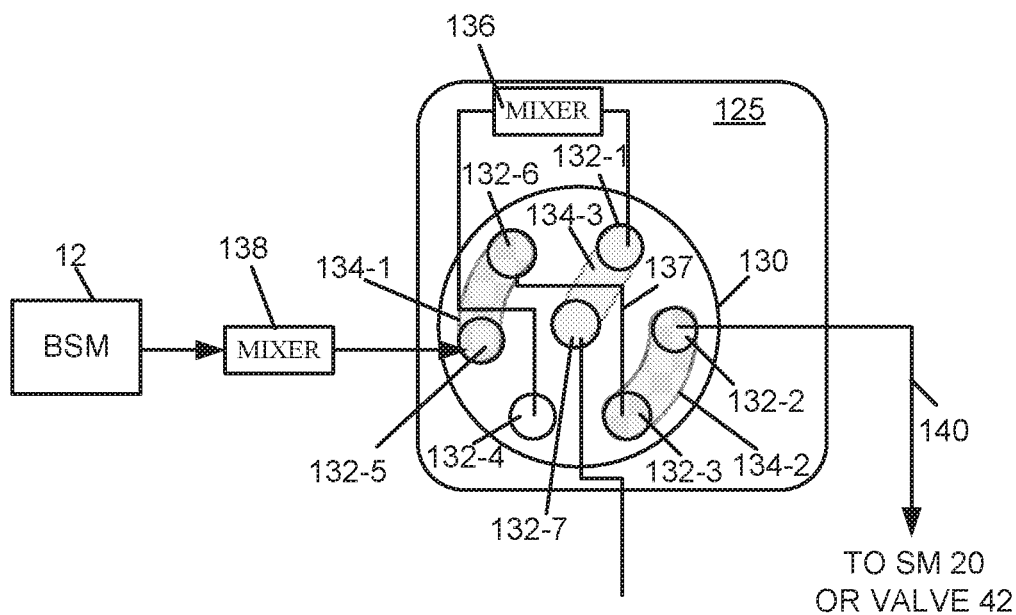
FIG. 12 is a diagram of an embodiment of a pump valve capable of automatically changing the system volume of the LC system by adding a mixer to the flow path, the pump valve being positioned to bypass the mixer.

FIG. 12 shows an embodiment of a valve pod 125 with a single valve 130 used to change the system volume of a chromatography system. The pod 125 containing the valve 130 may replace a conventional vent valve pod that is part of the BSM 12. Except for changes to the plumbing, the valve 130 can be responsive to a valve drive previously used to operate the vent valve. The valve pod 125 gives the BSM 12 additional functionality (as described in FIG. 12 and FIG. 13), while maintaining conventional functionality (as described in connection with FIG. 14 and FIG. 15). Each position of the valve 130 (in combination with each position of a second valve, if any) can be initially qualified and, therefore, any change in selection of the valve position does not require a subsequent requalification as a result of the change.

The valve 130 has seven stator ports 132-1, 132-2, 132-3, 132-4, 132-5, 132-6, and 132-7 (generally, 132) and three rotor channels 134-1, 134-2, 134-3 (generally, 134). Six of the stator ports 132-1, 132-2, 132-3, 132-4, 132-5, and 132-6 are symmetrically disposed along a radius of an imaginary circle on the stator; the seventh stator port 132-7 is at the center of the stator. Rotor channels 134-1 and 134-2 are arcuate in shape, and rotor channel 134-3 is linear. Each of the arcuate rotor channels 134-1, 134-2 connects together two stator ports 132 on the radius of the imaginary circle. Rotor channel 134-3 connects the center stator port 132-7 to one of the stator ports on the radius. In addition, a mixer 136 is connected between stator ports 132-1 and 132-4. The stator port 132-5 is connected to the BSM 12 through a second mixer 138. This second mixer 138 is external to the valve pod 125 and may be part of the BSM 12. Stator port 132-2 is connected to the sample manager 20 through tubing 140.

In the configuration shown in FIG. 12, only the second mixer 138 is in the flow path. Arcuate rotor channel 134-1 connects stator ports 132-5 and 132-6, arcuate rotor channel 134-2 connects stator ports 132-2 and 132-3, and linear rotor channel 134-3 connects center stator port 132-7 to stator port 132-1.

During operation of the LC system 10, the BSM 12 pumps gradient through the mixer 138 into the stator port 132-5 of the valve 130 of the valve pod 125. From the stator port 132-5, the gradient passes through the rotor channel 134-1 to the stator port 132-6. Passing through tubing 137, the gradient arrives at the stator port 132-3. The gradient then passes through the rotor channel 134-2 to exit the valve 130 through stator port 132-2. From the stator port 132-2, the gradient exits the valve pod 125 for delivery through tubing 140 to a stator port of the valve 54 (FIG. 2) of the sample manager 20 or to a second valve of a valve manager. In this configuration, the volume of the mixer 136 is not in the flow path and, thus, not included in the system volume.

Figure 13:
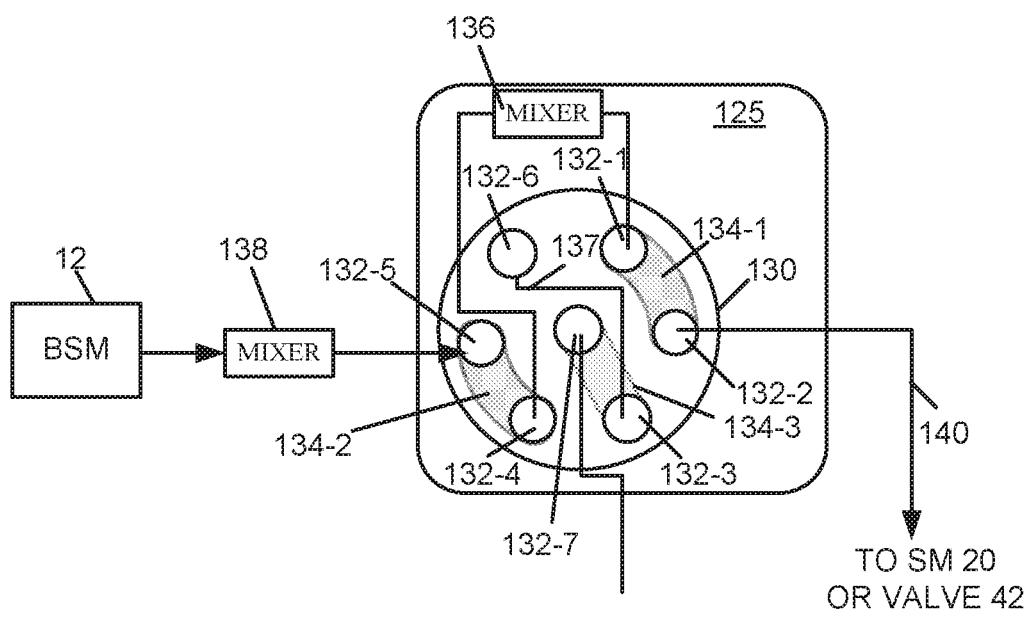
FIG. 13 is a diagram of the valve manager of FIG. 12, wherein the pump valve is positioned to add the mixer to the flow path.

FIG. 13 shows the embodiment of the valve pod 125 of FIG. 12 with the single valve 130 in a position that places the mixer 136 into the flow path in series with the second mixer 138. With respect to FIG. 12, the rotor is turned two steps clockwise (or four steps counterclockwise). In the position shown, arcuate rotor channel 134-1 connects stator ports 132-1 and 132-2, arcuate rotor channel 134-2 connects stator ports 132-4 and 132-5, and linear rotor channel 134-3 connects center stator port 132-7 to stator port 132-3.

During operation, the BSM 12 pumps gradient through the mixer 138 into the stator port 132-5 of the valve 130 of the valve pod 125. From the stator port 132-5, the gradient passes through the rotor channel 134-2 to the stator port 132-4. The gradient then passes through the mixer 136 to the stator part 132-1, then through rotor channel 134-1 to exit the valve 130 through stator part 132-2. From the stator port 132-2, the gradient exits the valve pod 125 for delivery through tubing 140 to a stator port of the valve 54 (FIG. 2) of the sample manager 20 or to a second valve of a valve manager. In this configuration, the volume of both mixers 136, 138 are in the flow path.

Figure 14:
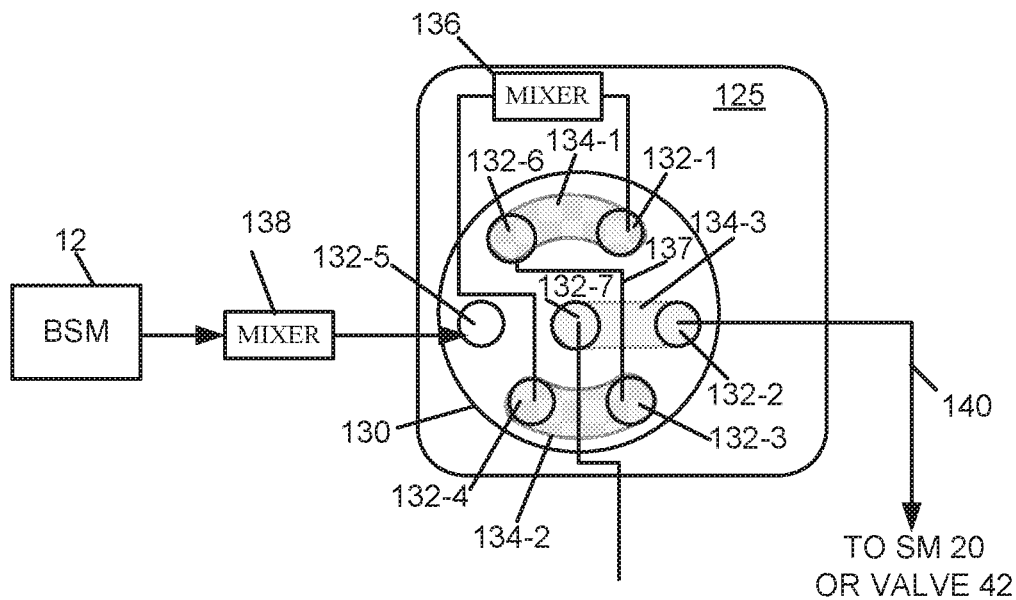
FIG. 14 is a diagram of the valve manager of FIG. 12, wherein the pump valve is positioned to facilitate a leak test of the LC system.

FIG. 14 shows the embodiment of the valve pod 125 of FIG. 12 with the single valve 130 in a dead-end position to facilitate a leak test. With respect to FIG. 12, the rotor is turned one step clockwise (or five steps counterclockwise). In the position shown, arcuate rotor channel 134-1 connects stator ports 132-1 and 132-6, arcuate rotor channel 134-2 connects stator ports 132-3 and 132-4, and linear rotor channel 134-3 connects center stator port 132-7 to stator port 132-2. In this position, the valve 130 has no flow path from the BSM 12 to the sample manager 20, and the mixer 136 is part of an isolated loop formed together with the rotor channels 134-1 and 134-2 and the connection 137 between the channels.

Figure 15:
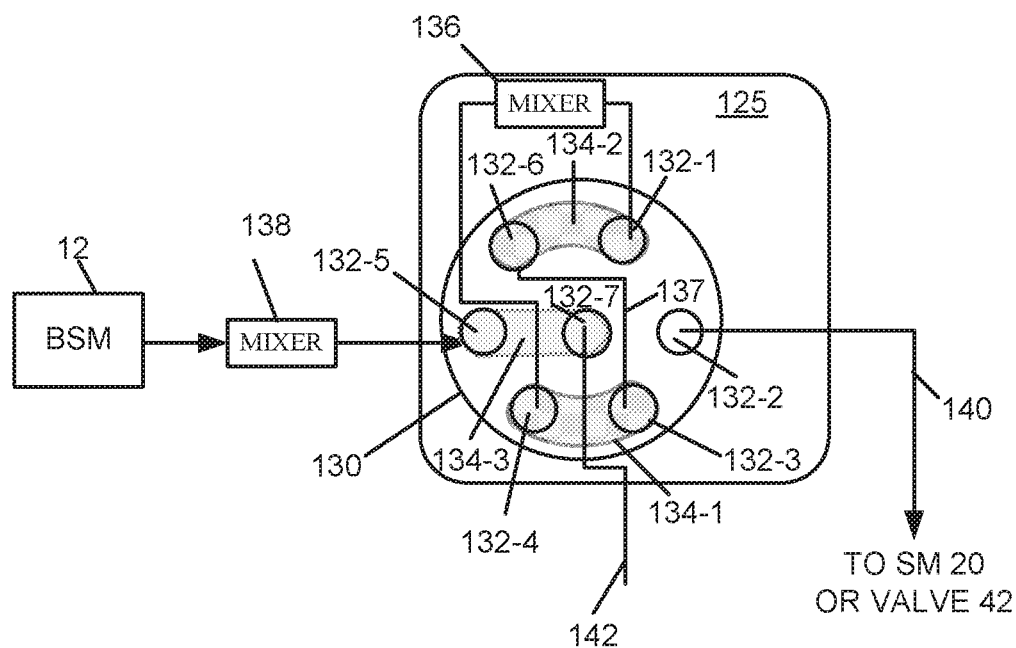
FIG. 15 is a diagram of the valve manager of FIG. 12, wherein the pump valve is positioned to vent LC system.

FIG. 15 shows the embodiment of the valve pod 125 of FIG. 12 with the single valve 130 in a position to vent the flow path. With respect to FIG. 12, the rotor is turned four steps clockwise (or two steps counterclockwise). In the position shown, arcuate rotor channel 134-1 connects stator ports 132-3 and 132-4, arcuate rotor channel 134-2 connects stator ports 132-1 and 132-6, and linear rotor channel 134-3 connects center stator port 132-7 to stator port 132-5. In this position, the flow path from the BSM 12 passes through a vent tube 142 into waste. As in FIG. 14, the mixer 136 is part of an isolated loop formed together with the rotor channels 134-1 and 134-2 and the connection 137 between the channels.

FIGS. 16 through FIG. 19 show the embodiment of the valve pod 125 of FIG. 12, having the single valve 130, configured with both mixers 136, 138 (i.e., the mixer 138 that was external to the valve pod 125 in FIG. 12 is here integrated into the valve pod 125). As described in FIG. 12, the valve pod 125 may replace a conventional vent valve pod that is part of the BSM 12, to give the BSM 12 additional functionality (as described in FIG. 16 and FIG. 17), while maintaining conventional functionality (as described in connection with FIG. 18 and FIG. 19). Each position of the valve 130 (in combination with each position of a second valve, if any) can be initially qualified and, therefore, any change in selection of the valve position does not require a subsequent requalification as a result of the change.

In each of the FIGS. 16 through FIG. 19, the second mixer 138 is connected between the stator port 132-6 and the stator port 132-3 of the valve 130. The connection of the first mixer 136 between stator parts 132-1, 132-4 and the other connections between the rotor channels 134 and stator ports 132 in FIGS. 16 through FIG. 19 are the same as those described in connection with FIGS. 12 through FIG. 15, respectively.

Figure 16:
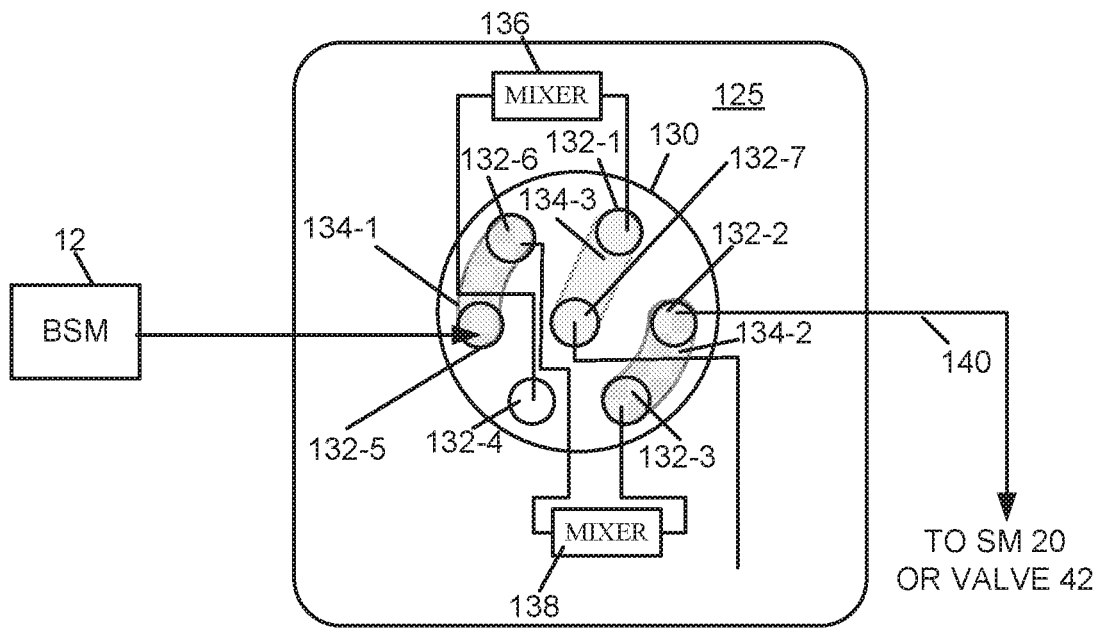
FIG. 16 is a diagram of another embodiment of a pump valve capable of automatically changing the system volume of the LC system by selectively adding one of two mixers to the flow path, the valve being positioned to add a first mixer to the flow path.

In FIG. 16, the position of the single valve 130 has only the second mixer 138 in the flow path from the BSM 12 to the sample manager 20. The flow path passes from the BSM 12 to the stator port 132-5 of the valve 130, from the stator port 132-5 through the rotor channel 134-1 to the stator port 132-6, from the stator port 132-6 through the second mixer 138 to the stator port 132-3. From the stator port 132-3, the flow path continues through the rotor channel 134-2 to stator port 132-2 and exits the valve pod 125 through tubing 140 to a stator port of the valve 54 (FIG. 2) of the sample manager 20 or a second valve of a valve manager. In this configuration, the volume of the first mixer 136 is not in the flow path and, thus, not included in the system volume, such as illustrated in FIG. 12.

Figure 17:
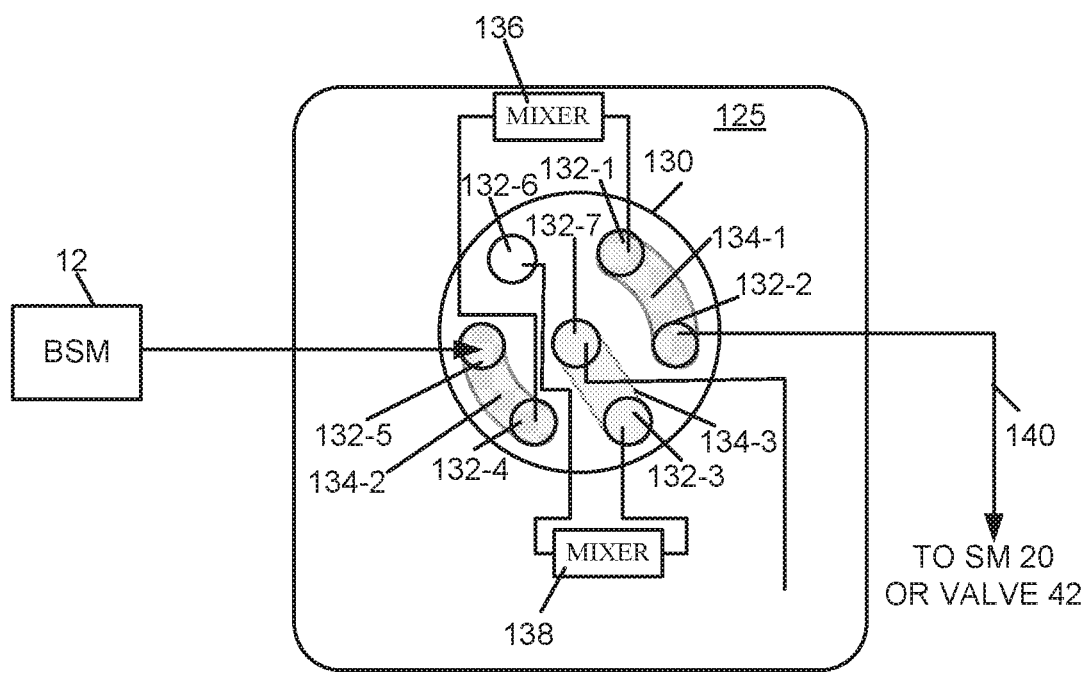
FIG. 17 is a diagram of the valve manager of FIG. 16, wherein the pump valve is positioned to add the other of the two mixers to the flow path.

FIG. 17 shows the position of the single valve 130 wherein only the first mixer 136 is in the flow path from the BSM 12 to the sample manager 20. With respect to FIG. 16, the rotor is turned two steps clockwise (or four steps counterclockwise). In this position shown, the connections are the same as those described in connection with FIG. 13: arcuate rotor channel 134-1 connects stator ports 132-1 and 132-2; arcuate rotor channel 134-2 connects stator ports 132-4 and 132-5; and linear rotor channel 134-3 connects center stator port 132-7 to stator port 132-3.

The flow path passes from the BSM 12 to the stator port 132-5, from the stator port 132-5 through the rotor channel 134-2 to the stator port 132-4, from the stator port 132-4 through the first mixer 136 to the stator port 132-1. From the stator port 132-1, the flow path continues through the rotor channel 134-1 to stator port 132-2 and exits the valve pod 125 throw tubing 140 to a stator port of the valve 54 (FIG. 2) of the sample manager 20. In this configuration, the volume of the second mixer 138 is not in the flow path and, thus, not included in the system volume.

Figure 18:
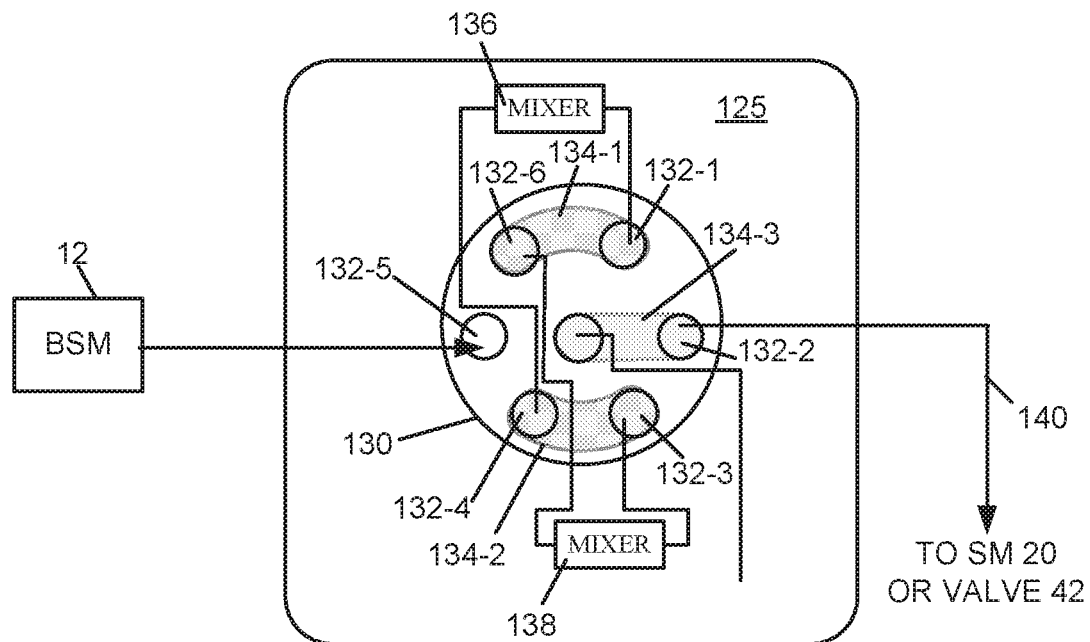
FIG. 18 is a diagram of the valve manager of FIG. 16, wherein the pump valve is positioned to facilitate a leak test of the LC system.

FIG. 18 shows the valve 130 in a dead-end position to facilitate a leak test. With respect to FIG. 16, the rotor is turned one step clockwise (or five steps counterclockwise). In the position shown, arcuate rotor channel 134-1 connects stator ports 132-1 and 132-6, arcuate rotor channel 134-2 connects stator ports 132-3 and 132-4, and linear rotor channel 134-3 connects center stator port 132-7 to stator port 132-2, just as described in connection with FIG. 14. In this position, the valve 130 has no flow path from the BSM 12 to the sample manager 20, and both mixers 136, 138 are part of an isolated loop formed together with the rotor channels 134-1 and 134-2.

Figure 19:
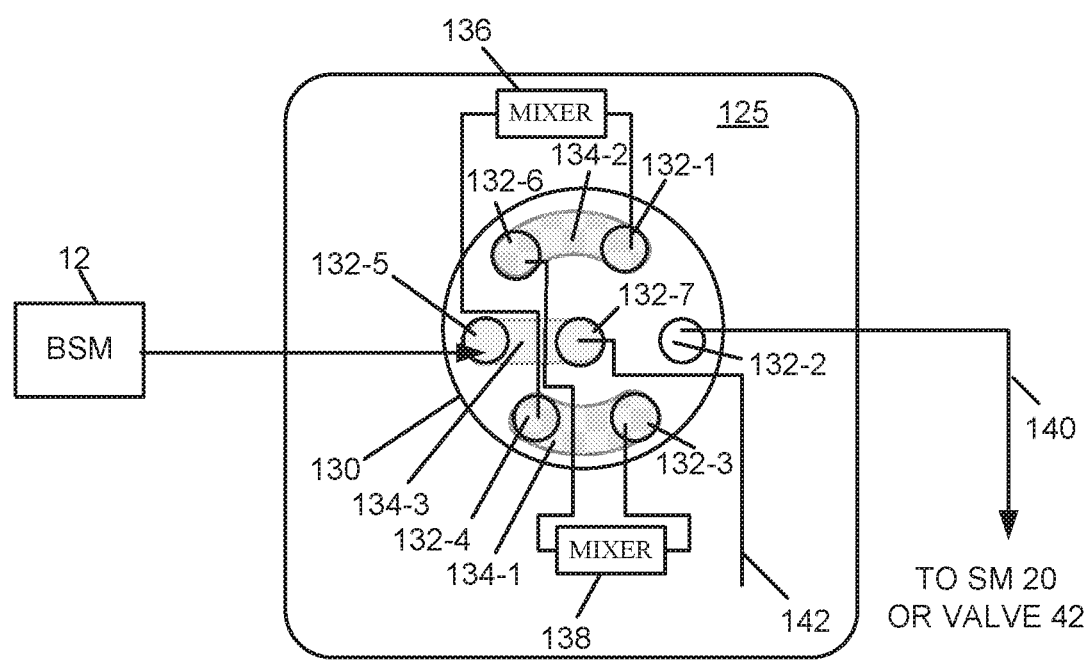
FIG. 19 is a diagram of the valve manager of FIG. 12, wherein the pump valve is positioned to vent the LC system.

FIG. 19 shows the valve 130 in a position to vent the flow path. With respect to FIG. 16, the rotor is turned four steps clockwise (or two steps counterclockwise). In the position shown, arcuate rotor channel 134-1 connects stator ports 132-3 and 132-4, arcuate rotor channel 134-2 connects stator ports 132-1 and 132-6, and linear rotor channel 134-3 connects center stator port 132-7 to stator port 132-5, just as described in connection with FIG. 15. In this position, the flow path from the BSM 12 passes through a vent tube 142 into waste. As in FIG. 18, the mixers 136, 138 are part of an isolated loop formed together with the rotor channels 134-1 and 134-2.

Figure 20:
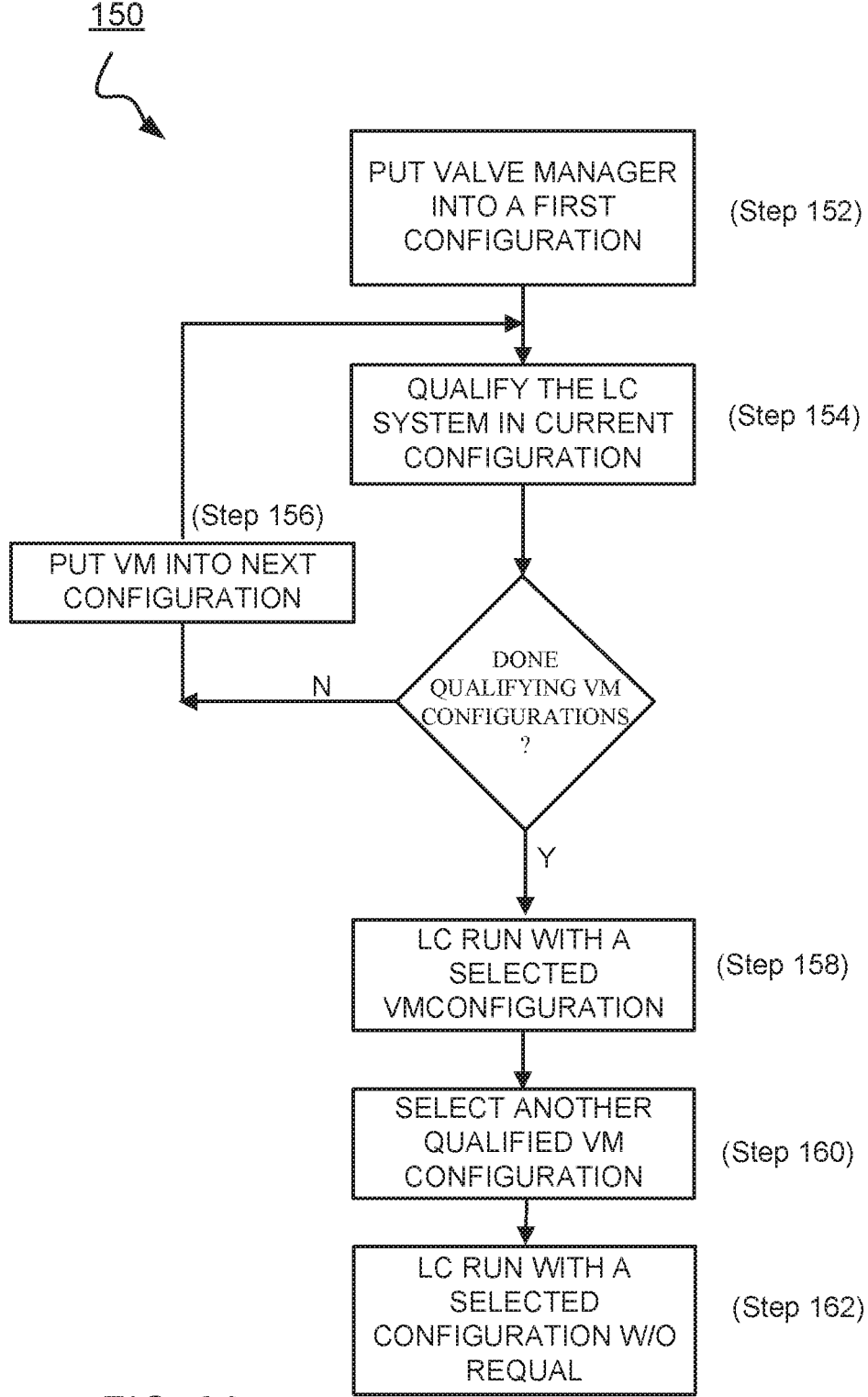
FIG. 20 is a flow chart of an embodiment of a process automatically changing the system volume of the LC system, sample dispersion volume, or both, without requiring a system requalification in response to the change.

FIG. 20 shows an embodiment of a process 150 that uses a reconfigurable valve manager 14 to facilitate changing system volume, sample dispersion volume, or both of an LC system without requiring requalification as a result of the change. At step 152, the valve manager is put into a first configuration, for example, one without any mixer in the flow path as in FIG. 2. While in this configuration, the system is qualified (step 154). If there are other configurations to be qualified, the VM 14 is placed (step 156) into the next select configuration, and then the LC system is qualified (step 154) with the VM in that configuration. The qualification of the LC system 10 with each subsequently selected VM configuration continues until all desired configurations are qualified. The information gathered during the qualifications can be stored to establish a performance baseline for each of the configurations.

After all desired VM configurations are qualified, the LC system can perform (step 158) a chromatography run in one of the selected configuration. Then, when, at step 160, another of the qualified VM configurations is selected, the LC system 10 can perform (step 162) a chromatography run in using that selected configuration without having to qualify the LC system before doing so.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved.

It will also be noted that each block of the block diagrams and/or flowchart illustration, combinations of blocks in the block diagrams and/or flowchart illustration, can be implemented by special purpose hardware-based systems that perform the specified functions or acts, or combinations of special purpose hardware and computer instructions.

It is to be understood that such terms like above, below, upper, lower, left, leftmost, right, rightmost, top, bottom, front, and rear are relative terms used for purposes of simplifying the description of features as shown in the figures, and are not used to impose any limitation on the structure or use of any thermal systems described herein. While the invention has been shown and described with reference to specific embodiments, it should be understood by those skilled in the art that various changes in form and detail may be made therein without departing from the spirit and scope of the invention as defined by the following claims.

What is claimed is:

1. A chromatography system having an associated system volume and a sample dispersion volume, the chromatography system comprising:
    a system volume defined as an overall fluid volume between where gradient is proportioned until an inlet of a chromatography column;
    a pump pumping a flow of gradient;
    a sample manager for introducing a sample to the flow of gradient; and
    at least one valve fluidically coupled to the pump, a first valve of the at least one valve having a plurality of ports including an inlet port that receives the flow of gradient from the pump and an outlet port through which the flow of gradient exits the first valve, the first valve having at least two different, automatically selectable positions, wherein a first position of the at least two different automatically selectable positions of the first valve increases the system volume of the chromatography system relative to when the first valve is in a second position.

2. The chromatography system of claim 1, further comprising:
    a valve drive operatively coupled to the first valve; and
    a processor in communication with the valve drive, the processor being programmed to qualify the chromatography system with the first valve in the first position, to operate the valve drive to switch the first valve automatically from the first position into a second position of the at least two different automatically selectable positions, and to qualify the chromatography system with the first valve in the second position.

3. The chromatography system of claim 1, further comprising at least one mixer, a first mixer of the at least one mixer being connected between a third port and a fourth port of the first valve, and wherein the first position of the at least two different automatically selectable positions of the first valve places the first mixer of the at least one mixer into a path of the flow of gradient from the pump to change the system volume of the chromatography system.

4. The chromatography system of claim 3, wherein a volume of the first mixer is predetermined to increase the system volume of the chromatography system to match a system volume of another model of chromatography system.

5. The chromatography system of claim 3, further comprising a second mixer disposed in the path of the flow of gradient between the pump and the first valve.

6. The chromatography system of claim 3, further comprising a second mixer of the at least one mixer connected between a fifth port and a sixth port of the first valve, wherein a second position of the at least two different positions of the first valve places the second mixer of the at least one mixer into the path of the flow of gradient from the pump, while removing the first mixer from the path.

7. The chromatography system of claim 1, wherein the pump comprises the first valve.

8. The chromatography system of claim 1, wherein the first valve includes seven ports.

9. The chromatography system of claim 1, wherein the sample manager includes a flow-through needle with a tip and a proximal end opposite the tip, and wherein the at least one valve includes a second valve that operates to change a sample dispersion volume of the chromatography system by directing the flow of gradient in a reverse direction through the sample manager such that the flow of gradient enters the flow-through needle through the tip.

10. The chromatography system of claim 1, further comprising at least one mixer, a first mixer of the at least one mixer being connected between a third port and a fourth port of the first valve, and wherein the first position of the at least two different automatically selectable positions of the first valve places the first mixer of the at least one mixer into a path of flow of sample composition between the sample manager and a column manager.

11. The chromatography system of claim 10, wherein the at least one mixer includes a second mixer connected between a fifth port and a sixth port of the first valve, wherein a second position of the at least two different automatically selectable positions of the first valve places the second mixer into the path of the flow of sample composition between the sample manager and a column manager, while removing the first mixer from the path of the flow of sample composition between the sample manager and the column manager.

12. The chromatography system of claim 1, further comprising a column manager, and wherein the at least one valve includes a second valve, the second valve having a plurality of ports including an inlet port connected to the sample manager for receiving a flow of sample composition therefrom and an outlet port fluidically coupled to the column manager for passing the flow of sample composition thereto.

13. The chromatography system of claim 12, wherein the sample manager includes a flow-through needle with a tip and a proximal end opposite the tip, and wherein the second valve has a second inlet port connected to the outlet port of the first valve for receiving the flow of gradient therefrom, the second valve having at least two different automatically selectable positions, a first position of the at least two different positions of the second valve directing the flow of gradient through the sample manager in a forward direction such that the flow of gradient enters the flow-through needle through the proximal end and a second position of the at least two different positions of the second valve directing the flow of gradient through the sample manager in a reverse direction such that the flow of gradient enters the flow-through needle through the tip.

14. The chromatography system of claim 12, further comprising at least one mixer, a first mixer of the at least one mixer being connected between a third port and a fourth port of the first valve and a second mixer connected between a fifth port and a sixth port of the first valve, a second position of the at least two different automatically selectable positions of the first valve placing the second mixer into the path of the flow of gradient from the pump, while bypassing the first mixer.

15. The chromatography system of claim 14, wherein the sample manager includes a flow-through needle with a tip and a proximal end opposite the tip, and wherein the second valve has a second inlet port connected to the outlet port of the first valve for receiving the flow of gradient therefrom, the second valve having at least two different automatically selectable positions, a first position of the at least two different positions of the second valve directing the flow of gradient through the sample manager in a forward direction such that the flow of gradient enters the flow-through needle through the proximal end and a second position of the at least two different positions of the second valve directing the flow of gradient through the sample manager in a reverse direction such that the flow of gradient enters the flow-through needle through the tip.

16. The chromatography system of claim 12, wherein the outlet port of the first valve is fluidically coupled to the sample manager for passing the flow of gradient thereto, and further comprising:
 a first mixer connected between a third port and a fourth port of the first valve
 a second mixer connected between a fifth port and a sixth port of the first valve, wherein a second position of the at least two different automatically selectable positions of the first valve places the second mixer into the path of the flow of gradient from the pump, while removing the first mixer from the path; and
 a third mixer connected between a first port and a second port of the second valve, the second valve having at least two different automatically selectable positions, a first position of the at least two different automatically selectable positions of the second valve placing the third mixer in a path of the flow of sample composition between the sample manager and the column manager.

17. The chromatography system of claim 16, further comprising a fourth mixer connected between a third port and a fourth port of the second valve, wherein a second position of the at least two different automatically selectable positions of the second valve places the fourth mixer into the path of the flow of sample composition between the sample manager and the column manager, while removing the third mixer from the path of the flow of sample composition between the sample manager and the column manager.

18. A valve module, comprising:
 at least one rotary valve, a first rotary valve of the at least one rotary valve having a plurality of ports including an inlet port for receiving a flow of gradient and an outlet port through which the flow of gradient exits the first rotary valve, the first rotary valve having at least two different automatically selectable positions;
 at least one mixer including a first mixer connected between a third port and a fourth port of the first rotary valve; and
 a valve drive operatively coupled to the first rotary valve and responsive to a control command from a processor to switch the first rotary valve automatically into the first position of the at least two different automatically selectable positions to place the first mixer into a path of the flow of gradient, wherein the first mixer is not in the path of the flow of gradient when the first rotary valve is in the second position.

19. The valve module of claim 18, further comprising a second mixer of the at least one mixer connected between a fifth port and a sixth port of the first rotary valve, wherein a second position of the at least two different positions of the first rotary valve places the second mixer of the at least one mixer into the path of the flow of gradient from the pump, while removing the first mixer from the path.

20. The valve module of claim 18, wherein the first valve includes seven ports.

21. The valve module of claim 18, wherein the at least one rotary valve includes a second rotary valve, the second rotary valve having a plurality of ports including an inlet port for receiving a flow of sample composition from a sample manager and an outlet port fluidically coupled to a column manager for passing the flow of sample composition thereto.

22. The valve module of claim 21, wherein the second rotary valve has a second inlet port connected to the outlet port of the first rotary valve for receiving the flow of gradient therefrom, the second rotary valve having at least two different positions, a first position of the at least two different positions of the second valve for directing the flow of gradient through the sample manager in a forward direction and a second position of the at least two different positions of the second valve directing the flow of gradient through the sample manager in a reverse direction.

23. The valve module of claim 21, wherein the outlet port of the first rotary valve is fluidically coupled to the sample manager for passing the flow of gradient thereto, and further comprising:
 a second mixer, of the at least one mixer, connected between a fifth port and a sixth port of the first rotary valve, wherein a second position of the at least two different positions of the first rotary valve places the second mixer of the at least one mixer into the path of the flow of gradient from the pump, while removing the first mixer from the path; and
 a third mixer connected between a third port and a fourth port of the second rotary valve, the second valve having at least two different positions, a first position of the at least two different positions of the second valve placing the third mixer in a path of the flow of sample composition between the sample manager and the column manager.

24. The valve module of claim 23, further comprising a fourth mixer connected between a fifth port and a sixth port of the second rotary valve, wherein a second position of the at least two different positions of the second rotary valve places the fourth mixer into the path of the flow of sample composition between the sample manager and the column manager, while removing the third mixer from the path of the flow of sample composition between the sample manager and the column manager.

25. The valve module of claim 18, further comprising a second mixer of the at least one mixer connected between a fifth port and a sixth port of the first rotary valve, wherein a second position of the at least two different positions of the first rotary valve places the second mixer of the at least one mixer into the path of the flow of gradient from the pump, while removing the first mixer from the path.

26. The valve module of claim 25, wherein the second rotary valve has a second inlet port connected to the outlet port of the first rotary valve for receiving the flow of gradient therefrom, the second rotary valve having at least two different positions, a first position of the at least two different positions of the second rotary valve for directing the flow of gradient through the sample manager in a forward direction and a second position of the at least two different positions of the second valve for directing the flow of gradient through the sample manager in a reverse direction.

27. A method of running a liquid chromatography system having an associated system volume, wherein the system volume defined as an overall fluid volume between where gradient is proportioned until an inlet of a chromatography column, the liquid chromatography system further having at least one valve fluidically coupled to a pumping system and a sample manager, a first valve of the at least one valve having a plurality of ports including an inlet port that receives the flow of gradient from the pump and an outlet port through which the flow of gradient exits the first valve, the first valve having at least two different, automatically selectable positions, wherein a first position of the at least two different automatically selectable positions of the first valve increases the system volume of the chromatography system relative to when the first valve is in a second position, the method comprising:
   qualifying the liquid chromatography system with the first valve in the first position of the at least two different automatically selectable positions;
   qualifying the liquid chromatography system with the first valve in the second position of the at least two different automatically selectable positions;
   performing a chromatographic run with the first valve in the first position;
   switching the first valve from the first position to the second position; and
   performing a chromatographic run with the first valve in the second position without having to requalify the liquid chromatography system.

* * * * *